US007480599B2

(12) United States Patent
Russell, II

(10) Patent No.: US 7,480,599 B2
(45) Date of Patent: Jan. 20, 2009

(54) SINGLE CYCLE AND EQUILIBRIUM FUEL LOADING METHOD AND SYSTEM TO REDUCE CYCLE OUTAGE IN A BOILING WATER NUCLEAR REACTOR

(75) Inventor: William Earl Russell, II, Wilmington, NC (US)

(73) Assignee: Global Nuclear Fuel - Americas, L.L.C., Wilmington, NC (US)

( * ) Notice: Subject to any disclaimer, the term of this patent is extended or adjusted under 35 U.S.C. 154(b) by 20 days.

(21) Appl. No.: 11/617,396

(22) Filed: Dec. 28, 2006

(65) Prior Publication Data

US 2008/0159462 A1    Jul. 3, 2008

(51) Int. Cl.
    *G06F 17/10*    (2006.01)
(52) U.S. Cl. .................... 703/2; 703/6; 376/267
(58) Field of Classification Search .............. 703/2, 703/6, 13, 22; 376/267–272
    See application file for complete search history.

(56) References Cited

U.S. PATENT DOCUMENTS 6,748,348 B1 * 6/2004 Russell, II .................... 703/6
6,862,329 B1 * 3/2005 Kropaczek et al. ......... 376/267
6,934,350 B1 * 8/2005 Challberg et al. .......... 376/353

OTHER PUBLICATIONS

Montes et al. J.L. Searching for Full Power Control Rod Patterns in a Boiling Water Reactor Using Genetic Algorithms, Annals of Nuclear Energy, vol. 31, Iss. 16, Nov. 2004, pp. 1939-1954.*
Francois et al., J.L. Development of an Automated System for Fuel Patterns Design, Nuclear Engineering and Design, vol. 193, ISS 1-2, Sep. 1999, pp. 13-21.*

* cited by examiner

*Primary Examiner*—Russell Frejd
(74) *Attorney, Agent, or Firm*—Nixon & Vanderhye P.C.

(57) ABSTRACT

A method for generating fuel loading data for a core in a nuclear reactor, wherein the core includes an array of fuel locations in the core, the method includes: defining an even cycle bundle shift map of fuel bundles to be shifted to another core location during an even fuel loading cycle; defining an odd cycle shift map of fuel bundles to be shifted to another core location during an odd loading cycle, wherein the odd cycle and even cycle are alternative and successive core refueling cycles; defining a discharge map identifying the another locations to receive the bundles from the locations identified in the even and odd cycle shift maps, and generating shuffling instructions indicating which fuel bundles from a prior fuel cycle are to be shifted to one of the another locations of the core for a subsequent fuel cycle, wherein bundles to be shifted during the even fuel loading cycle are selected from the fuel bundles to be shifted identified in the even cycle bundle shift map and bundles to be shifted during the odd fuel loading cycle are selected from the fuel bundles to be shifted identified in the odd cycle bundle shift map.

20 Claims, 19 Drawing Sheets

Automated Shuffle Design
Minimization Methodology

BUNDLE AVERAGE EXPOSURE (GWD/T)

|  | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 |  |  |  |  |  |  |  |  |  |  |  |  |  |  | 40.1 | 39.0 |
| 2 |  |  |  |  |  |  |  |  |  | 39.2 | 37.8 | 36.4 | 35.0 | 30.4 | 29.5 | 0.0 |
| 3 |  |  |  |  |  |  |  |  | 32.6 | 13.1 | 0.0 | 16.0 | 0.0 | 17.1 | 0.0 | 18.3 |
| 4 |  |  |  |  |  | 40.4 | 37.7 | 28.9 | 15.2 | 0.0 | 19.0 | 0.0 | 20.1 | 0.0 | 20.0 | 0.0 |
| 5 |  |  |  |  | 37.8 | 34.3 | 0.0 | 17.0 | 0.0 | 20.3 | 0.0 | 21.7 | 0.0 | 21.5 | 0.0 | 21.6 |
| 6 |  |  |  | 40.4 | 34.0 | 0.0 | 18.2 | 0.0 | 21.8 | 0.0 | 21.9 | 0.0 | 23.0 | 0.0 | 22.6 | 0.0 |
| 7 |  |  |  | 37.6 | 0.0 | 18.2 | 0.0 | 21.3 | 0.0 | 22.0 | 0.0 | 23.3 | 0.0 | 23.1 | 0.0 | 23.5 |
| 8 |  |  | 32.2 | 28.9 | 17.1 | 0.0 | 21.3 | 0.0 | 21.5 | 0.0 | 22.7 | 0.0 | 23.2 | 0.0 | 23.1 | 0.0 |
| 9 |  |  |  | 15.3 | 0.0 | 21.9 | 0.0 | 21.6 | 0.0 | 22.7 | 0.0 | 23.2 | 0.0 | 23.3 | 0.0 | 22.5 |
| 10 | 38.5 | 13.2 | 0.0 | 0.0 | 20.3 | 0.0 | 22.1 | 0.0 | 23.5 | 0.0 | 23.4 | 0.0 | 24.0 | 0.0 | 23.4 | 0.0 |
| 11 | 37.8 | 0.0 | 19.0 | 0.0 | 21.7 | 0.0 | 22.6 | 0.0 | 23.3 | 0.0 | 23.3 | 0.0 | 22.6 | 0.0 | 23.4 | 24.1 |
| 12 | 36.3 | 16.2 | 0.0 | 0.0 | 21.7 | 0.0 | 22.6 | 0.0 | 23.2 | 0.0 | 23.2 | 0.0 | 23.2 | 0.0 | 23.1 | 0.0 |
| 13 | 34.0 | 0.0 | 20.3 | 0.0 | 0.0 | 22.3 | 0.0 | 23.3 | 0.0 | 23.3 | 0.0 | 23.2 | 0.0 | 23.3 | 0.0 | 23.5 |
| 14 | 29.6 | 17.5 | 0.0 | 0.0 | 21.3 | 0.0 | 23.1 | 0.0 | 24.0 | 0.0 | 23.4 | 0.0 | 24.1 | 0.0 | 23.7 | 0.0 |
| 15 | 40.0 | 28.2 | 0.0 | 20.9 | 0.0 | 22.7 | 0.0 | 23.8 | 0.0 | 23.4 | 0.0 | 24.2 | 0.0 | 23.7 | 0.0 | 23.6 |
| 16 | 38.4 | 0.0 | 18.6 | 0.0 | 21.8 | 0.0 | 22.8 | 0.0 | 22.5 | 0.0 | 23.4 | 0.0 | 23.5 | 0.0 | 22.9 | 27.7 |

(EVEN BLACK)

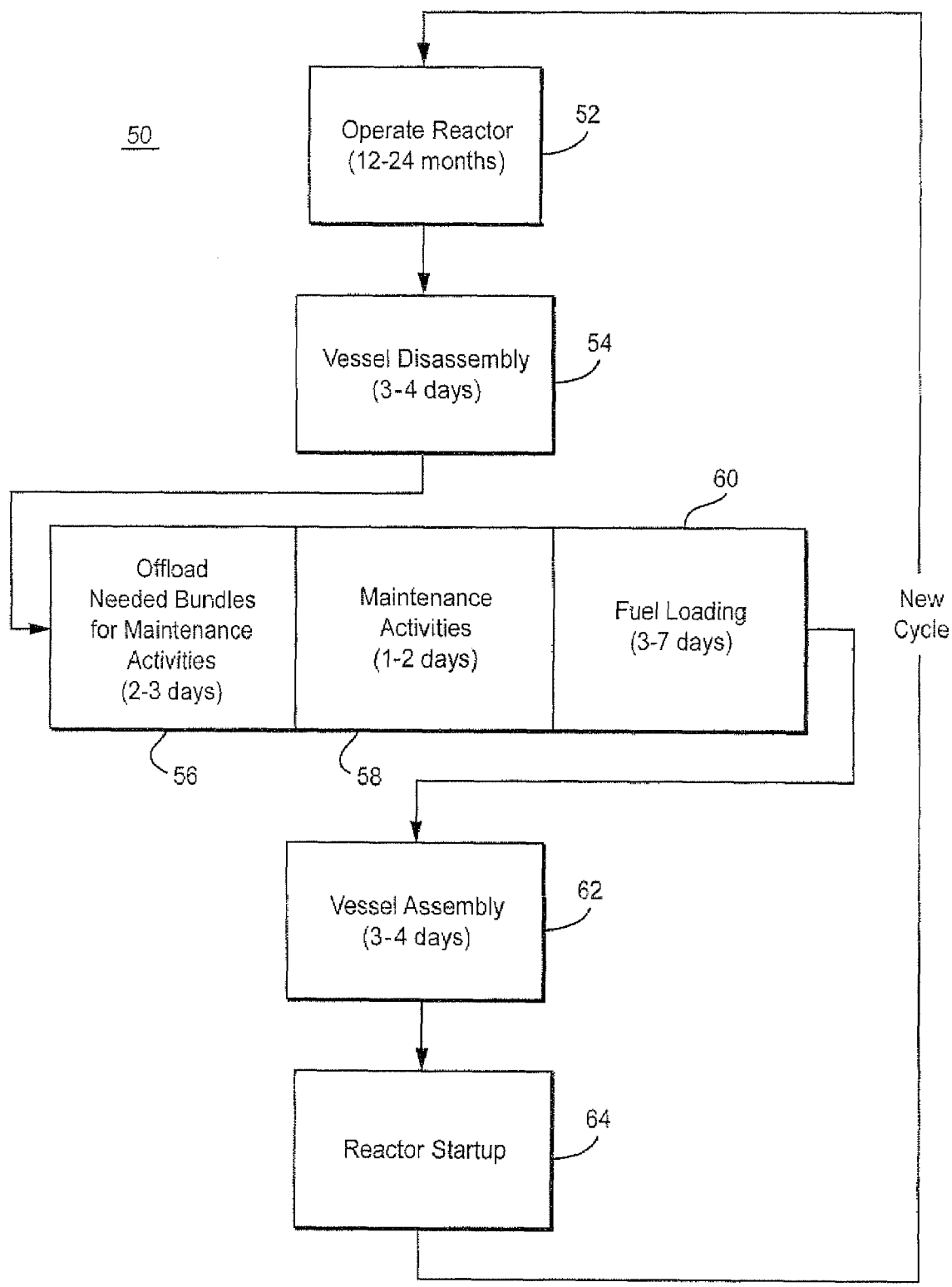
Fig. 7    Typical Reactor Cycle-to-Cycle Outage Activities

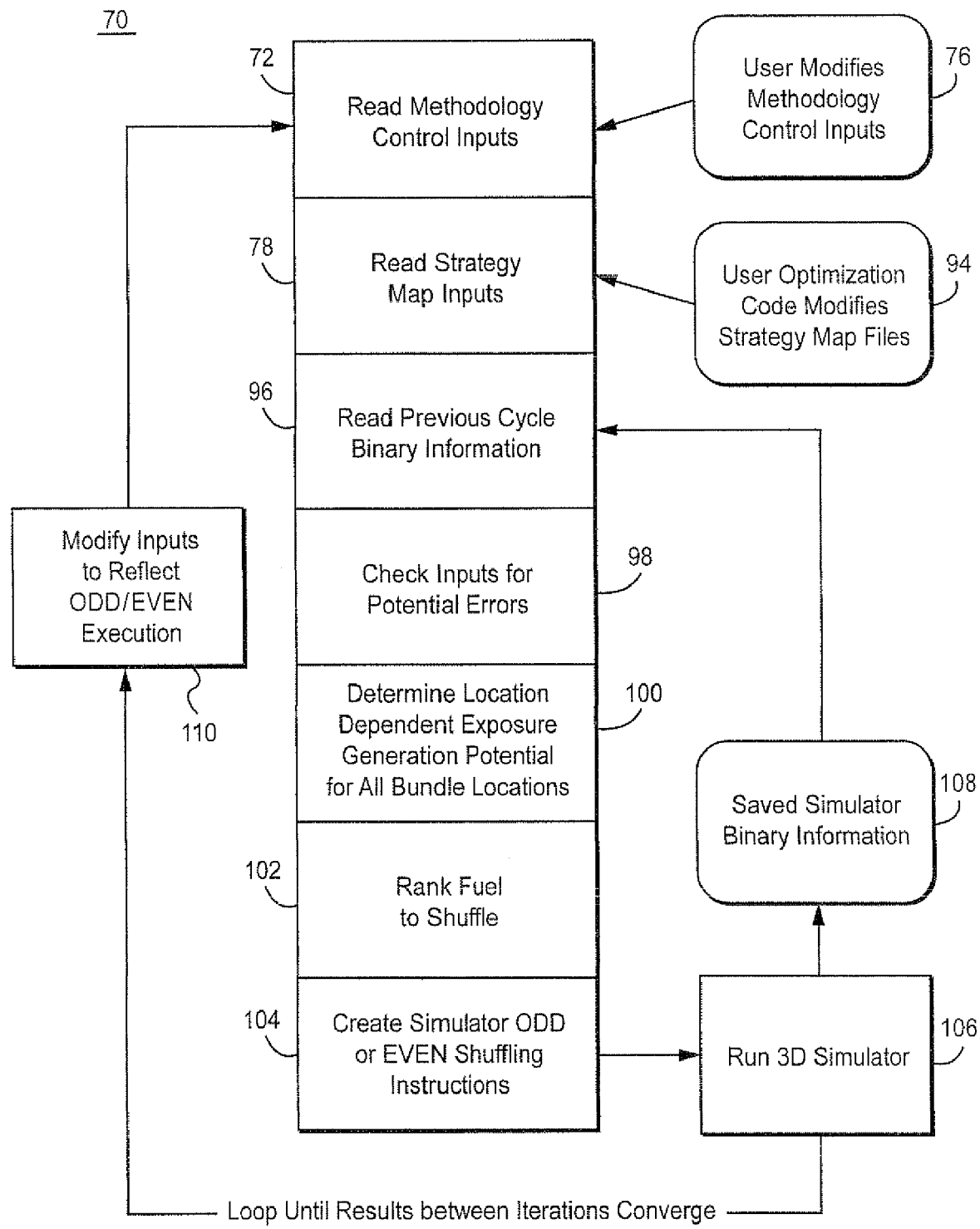
Fig. 8   Automated Shuffle Design Minimization Methodology

74

| | |
|---|---|
| Grand Gulf | - First "No-Shuffle" Design |
| 16 | Number of columns/rows in a quarter core |
| 2 | Number of Cycles to Make Loop |
| 86 | Number of Fresh bundles in quarter core |
| 200 | Number of total bundles in quarter core |
| 1 | Odd or Even Loading Requested (1=Odd, 2=Even) |
| 1 | Thermal Hydraulic Type |
| c05 | Lead Fresh bundle Characters |
| rods.ced | BOC Cedar File |
| BOC | BOC Qualifier |
| rods.ced | EOC Cedar File |
| EOC | EOC Qualifier |

Bundle Locations

```
    0 0 0 0 0 0 0 0 0 0 0 0 0 0 1 1
    0 0 0 0 0 0 0 0 0 1 1 1 1 1 1 1
    0 0 0 0 0 0 0 0 1 1 1 1 1 1 1 1
    0 0 0 0 0 1 1 1 1 1 1 1 1 1 1 1
    0 0 0 0 1 1 1 1 1 1 1 1 1 1 1 1
    0 0 0 1 1 1 1 1 1 1 1 1 1 1 1 1
    0 0 0 1 1 1 1 1 1 1 1 1 1 1 1 1
80  0 0 0 1 1 1 1 1 1 1 1 1 1 1 1 1
    0 0 1 1 1 1 1 1 1 1 1 1 1 1 1 1
    0 1 1 1 1 1 1 1 1 1 1 1 1 1 1 1
    0 1 1 1 1 1 1 1 1 1 1 1 1 1 1 1
    0 1 1 1 1 1 1 1 1 1 1 1 1 1 1 1
    0 1 1 1 1 1 1 1 1 1 1 1 1 1 1 1
    0 1 1 1 1 1 1 1 1 1 1 1 1 1 1 1
    1 1 1 1 1 1 1 1 1 1 1 1 1 1 1 1
    1 1 1 1 1 1 1 1 1 1 1 1 1 1 1 1
```

IAT Load

```
    0 0 0 0 0 0 0 0 0 0 0 0 0 0 0 0
    0 0 0 0 0 0 0 0 0 0 0 0 0 0 0 7
    0 0 0 0 0 0 0 0 0 7 7 3 3 3 3 3
    0 0 0 0 0 0 0 0 7 3 3 6 6 3 3 6
    0 0 0 0 0 0 7 3 3 3 3 6 4 2 2 5
    0 0 0 0 0 7 3 3 3 3 2 2 2 2 2 1
    0 0 0 0 7 3 3 3 2 2 2 2 2 2 2 1
82  0 0 0 0 3 3 3 4 4 2 2 4 4 2 2 5
    0 0 0 7 3 3 2 4 4 2 2 4 4 2 2 5
    0 0 7 3 3 3 2 2 2 2 2 2 2 2 2 1
    0 0 7 3 3 2 2 2 2 2 2 2 2 2 2 1
    0 0 3 6 6 2 2 4 4 2 2 4 4 2 2 5
    0 0 3 6 4 2 2 4 4 2 2 4 4 2 2 5
    0 0 3 3 2 2 2 2 2 2 2 2 2 2 2 1
    0 0 3 3 2 2 2 2 2 2 2 2 2 2 2 1
    0 7 3 6 5 1 1 5 5 1 1 5 5 1 1 0
```

Discharge Locations

```
    0 0 0 0 0 0 0 0 0 0 0 0 0 0 1 1
    0 0 0 0 0 0 0 0 0 1 1 1 1 1 1 0
    0 0 0 0 0 0 0 0 1 0 0 0 0 0 0 0
    0 0 0 0 0 1 1 1 0 0 0 0 0 0 0 0
    0 0 0 0 1 1 0 0 0 0 0 0 0 0 0 0
    0 0 0 1 1 0 0 0 0 0 0 0 0 0 0 0
    0 0 0 1 0 0 0 0 0 0 0 0 0 0 0 0
    0 0 0 1 0 0 0 0 0 0 0 0 0 0 0 0
84  0 0 1 0 0 0 0 0 0 0 0 0 0 0 0 0
    0 1 0 0 0 0 0 0 0 0 0 0 0 0 0 0
    0 1 0 0 0 0 0 0 0 0 0 0 0 0 0 0
    0 1 0 0 0 0 0 0 0 0 0 0 0 0 0 0
    0 1 0 0 0 0 0 0 0 0 0 0 0 0 0 0
    0 1 0 0 0 0 0 0 0 0 0 0 0 0 0 0
    1 1 0 0 0 0 0 0 0 0 0 0 0 0 0 0
    1 0 0 0 0 0 0 0 0 0 0 0 0 0 0 1
```

Fresh Locations (Odd)

86

```
0 0 0 0 0 0 0 0 0 0 0 0 0 0 0
0 0 0 0 0 0 0 0 0 0 0 0 0 0 0
0 0 0 0 0 0 0 0 0 1 0 1 0 1 0 1
0 0 0 0 0 0 0 0 1 0 1 0 1 0 1 0
0 0 0 0 0 0 0 1 0 1 0 1 0 1 0 1
0 0 0 0 0 0 1 0 1 0 1 0 1 0 1 0
0 0 0 0 0 1 0 1 0 1 0 1 0 1 0 1
0 0 0 0 1 0 1 0 1 0 1 0 1 0 1 0
0 0 0 1 0 1 0 1 0 1 0 1 0 1 0 1
0 0 1 0 1 0 1 0 1 0 1 0 1 0 1 0
0 0 1 0 1 0 1 0 1 0 1 0 1 0 1 0
0 0 1 0 1 0 1 0 1 0 1 0 1 0 1 0
0 0 0 1 0 1 0 1 0 1 0 1 0 1 0 1
0 0 1 0 1 0 1 0 1 0 1 0 1 0 1 0
0 0 0 1 0 1 0 1 0 1 0 1 0 1 0 1
0 0 1 0 1 0 1 0 1 0 1 0 1 0 1 0
```

Fresh Locations (Even)

88

```
0 0 0 0 0 0 0 0 0 0 0 0 0 0 0
0 0 0 0 0 0 0 0 0 0 0 0 0 0 1
0 0 0 0 0 0 0 0 0 1 0 1 0 1 0
0 0 0 0 0 0 0 0 1 0 1 0 1 0 1
0 0 0 0 0 0 0 1 0 1 0 1 0 1 0
0 0 0 0 0 0 1 0 1 0 1 0 1 0 1
0 0 0 0 0 1 0 1 0 1 0 1 0 1 0
0 0 0 0 1 0 1 0 1 0 1 0 1 0 1
0 0 0 1 0 1 0 1 0 1 0 1 0 1 0
0 0 0 1 0 1 0 1 0 1 0 1 0 1 0 1
0 0 1 0 1 0 1 0 1 0 1 0 1 0 1 0
0 0 1 0 1 0 1 0 1 0 1 0 1 0 1
0 0 1 0 1 0 1 0 1 0 1 0 1 0 1 0
0 0 0 1 0 1 0 1 0 1 0 1 0 1 0 1
0 0 1 0 1 0 1 0 1 0 1 0 1 0 1 0
0 1 0 1 0 1 0 1 0 1 0 1 0 1 0 0
```

Twice Burnt Fuel to Perimeter (Odd)

90

```
0 0 0 0 0 0 0 0 0 0 0 0 0 0 0
0 0 0 0 0 0 0 0 0 0 0 0 0 0 0
0 0 0 0 0 0 0 0 0 1 0 1 0 1 0 1
0 0 0 0 0 0 0 0 1 0 1 0 1 0 1 0
0 0 0 0 0 0 0 1 0 1 0 1 0 0 0 0
0 0 0 0 0 0 1 0 1 0 1 0 0 0 0 0
0 0 0 0 0 1 0 1 0 0 0 0 0 0 0 0
0 0 0 0 1 0 1 0 0 0 0 0 0 0 0 0
0 0 0 1 0 1 0 0 0 0 0 0 0 0 0 0
0 0 0 1 0 1 0 0 0 0 0 0 0 0 0 0
0 0 1 0 1 0 0 0 0 0 0 0 0 0 0 0
0 0 1 0 0 0 0 0 0 0 0 0 0 0 0 0
0 0 1 0 0 0 0 0 0 0 0 0 0 0 0 0
0 0 0 1 0 0 0 0 0 0 0 0 0 0 0 0
0 0 1 0 0 0 0 0 0 0 0 0 0 0 0 0
0 0 1 0 0 0 0 0 0 0 0 0 0 0 0 0
```

Twice Burnt Fuel to Perimeter (Even)

BUNDLE AVERAGE EXPOSURE (GWD/T)

(EVEN)

| row | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|
| 1 |   |   |   |   |   |   |   |   |   |   |   |   |   |   | 46.5 | 45.9 | 64 |
| 2 |   |   |   |   |   |   |   |   |   |   |   |   |   |   | 40.6 | 14.0 | 62 |
| 3 |   |   |   |   |   |   |   |   | 42.7 |   |   |   |   |   | 17.9 | 35.0 | 60 |
| 4 |   |   |   |   |   | 46.7 | 45.9 | 40.3 | 29.9 | 17.9 |   |   |   |   | 38.1 | 20.2 | 58 |
| 5 |   |   |   |   | 45.1 | 43.8 | 14.8 | 32.9 | 19.2 | 38.6 | 36.3 | 31.2 | 16.7 | 33.1 | 21.6 | 41.0 | 56 |
| 6 |   |   |   | 46.7 | 43.6 | 15.6 | 34.9 | 20.0 | 39.8 | 21.4 | 21.3 | 19.9 | 38.2 | 19.9 | 42.7 | 23.2 | 54 |
| 7 |   |   |   | 45.8 | 14.8 | 34.9 | 20.3 | 40.3 | 22.1 | 41.6 | 41.3 | 41.1 | 22.1 | 40.7 | 23.1 | 44.1 | 52 |
| 8 |   |   |   | 40.2 | 33.0 | 20.0 | 40.3 | 21.2 | 40.8 | 21.4 | 22.6 | 22.9 | 43.3 | 22.7 | 43.4 | 23.2 | 50 |
| 9 |   | 42.4 | 29.9 | 19.2 | 39.8 | 22.2 | 41.0 | 22.1 | 42.8 | 22.5 | 42.8 | 43.8 | 23.6 | 43.5 | 23.1 | 42.5 | 48 |
| 10 | 45.7 | 26.3 | 17.9 | 38.6 | 21.4 | 41.8 | 23.3 | 44.1 | 23.3 | 42.8 | 23.1 | 43.1 | 43.5 | 23.2 | 43.9 | 24.0 | 46 |
| 11 | 45.8 | 15.3 | 36.3 | 21.3 | 41.2 | 22.6 | 44.1 | 23.8 | 44.0 | 23.3 | 44.0 | 23.5 | 44.8 | 24.0 | 43.4 | 23.4 | 45.1 | 44 |
| 12 | 45.2 | 31.4 | 19.9 | 41.0 | 22.2 | 42.6 | 23.1 | 43.7 | 23.4 | 43.6 | 23.2 | 22.6 | 42.6 | 42.5 | 23.2 | 43.8 | 23.3 | 42 |
| 13 | 43.7 | 16.9 | 38.6 | 22.1 | 42.1 | 22.9 | 43.5 | 23.4 | 43.8 | 23.2 | 43.6 | 23.2 | 42.6 | 22.5 | 43.6 | 23.1 | 43.9 | 40 |
| 14 | 40.7 | 33.7 | 20.7 | 42.0 | 22.7 | 43.5 | 23.9 | 44.9 | 23.4 | 43.9 | 23.9 | 23.9 | 44.9 | 23.3 | 43.9 | 23.4 | 38 |
| 15 | 39.6 | 18.2 | 39.6 | 22.4 | 42.8 | 23.1 | 44.5 | 23.9 | 43.9 | 43.9 | 23.4 | 45.1 | 23.9 | 43.9 | 22.6 | 43.4 | 36 |
| 16 | 45.4 | 14.2 | 35.5 | 20.5 | 41.2 | 22.5 | 43.0 | 22.4 | 42.5 | 23.2 | 43.8 | 23.3 | 43.9 | 22.7 | 42.2 | 44.7 | 34 |
|   | 1 | 3 | 5 | 7 | 9 | 11 | 13 | 15 | 17 | 19 | 21 | 23 | 25 | 27 | 29 | 31 |   |

CPRRAT

| row\col | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|
| 1 |  |  |  |  |  |  |  |  |  |  |  |  |  |  |  | .258 .283 | 64 |
| 2 |  | (ODD) |  |  |  |  |  |  |  |  |  |  |  |  | .258 | .343 .428 | 62 |
| 3 |  |  |  |  |  |  |  |  |  | .293 | .327 | .361 | .385 | .427 | .524 | .645 | 60 |
| 4 |  |  |  |  |  |  |  | .411 |  | .466 | .454 | .561 | .490 | .603 | .726 .634 | .604 | 58 |
| 5 |  |  |  |  | .288 | .252 | .338 | .456 | .539 | .516 | .659 | .560 | .697 | .588 | .799 | .782 | 56 |
| 6 |  |  |  | .253 | .299 | .299 | .443 | .596 | .549 | .707 | .596 | .743 | .613 | .769 | .660 | .649 | 54 |
| 7 |  |  |  | .339 | .443 | .461 | .632 | .570 | .734 | .622 | .776 | .632 | .784 | .644 | .824 | .814 | 52 |
| 8 |  |  | .412 | .457 | .596 | .632 | .578 | .750 | .630 | .797 | .652 | .800 | .651 | .809 | .669 | .678 | 50 |
| 9 |  |  | .466 | .539 | .548 | .569 | .749 | .645 | .812 | .662 | .819 | .662 | .817 | .665 | .819 | .832 | 48 |
| 10 |  | .295 | .453 | .516 | .707 | .733 | .628 | .808 | .667 | .825 | .668 | .821 | .666 | .823 | .662 | .663 | 46 |
| 11 |  | .327 | .559 | .559 | .597 | .622 | .792 | .653 | .814 | .664 | .820 | .662 | .814 | .665 | .805 | .805 | 44 |
| 12 |  | .361 | .487 | .691 | .745 | .779 | .651 | .808 | .660 | .819 | .664 | .817 | .661 | .817 | .660 | .651 | 42 |
| 13 |  | .385 | .596 | .575 | .611 | .640 | .808 | .662 | .819 | .666 | .825 | .672 10 | .826 | .660 | .805 | .780 | 40 |
| 14 |  | .428 | .518 | .712 | .758 | .791 | .658 | .816 | .665 | .822 | .666 | .825 | .664 | .803 | .643 | .606 | 38 |
| 15 | .260 | .353 | .638 | .596 | .622 | .642 | .808 | .659 | .814 | .665 | .816 | .653 | .793 | .633 | .761 | .683 | 36 |
| 16 | .283 | .425 |  |  | .774 | .795 | .658 | .815 | .664 | .819 | .661 | .795 | .636 | .760 | .594 |  |  |
|  |  |  |  |  |  | .652 | .819 | .677 | .832 | .670 | .814 | .650 | .778 | .610 | .690 | .535 0 | 34 |
|  | 1 | 3 | 5 | 7 | 9 | 11 | 13 | 15 | 17 | 19 | 21 | 23 | 25 | 27 | 29 | 31 |  |

| | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|
| | | | (EVEN) | | | | | | | | | | | | | | |
| 1 | | | | | | | | | | | | | | | .277 | .305 | 64 |
| 2 | | | | | | | | | | | .329 | .361 | .389 | .437 | .357 | .511 | 62 |
| 3 | | | | .263 | .304 | .263 | .340 | .447 | .398 | .290 | .528 | .476 | .583 | .510 | .638 | .545 | 60 |
| 4 | | | | .340 | .308 | .307 | .520 | .499 | .455 | .408 | .544 | .679 | .573 | .717 | .603 | .742 | 58 |
| 5 | | | .398 | .447 | .520 | .552 | .530 | .691 | .658 | .613 | .728 | .605 | .754 | .628 | .779 | .639 | 56 |
| 6 | | | .407 | .455 | .499 | .530 | .705 | .610 | .598 | .577 | .631 | .777 | .637 | .794 | .649 | .800 | 54 |
| 7 | | | .527 | .612 | .657 | .691 | .609 | .789 | .775 | .760 | .800 | .649 | .800 | .655 | .811 | .660 | 52 |
| 8 | | | .473 | .543 | .577 | .597 | .773 | .656 | .659 | .645 | .663 | .814 | .662 | .818 | .668 | .830 | 50 |
| 9 | | | .578 | .677 | .728 | .759 | .642 | .803 | .820 | .815 | .821 | .664 | .818 | .666 | .824 | .677 | 48 |
| 10 | .291 | | .502 | .568 | .605 | .632 | .799 | .655 | .658 | .666 | .663 | .812 | .660 | .817 | .665 | .813 | 46 |
| 11 | .327 | | .627 | .703 | .751 | .785 | .655 | .813 | .810 | .817 | .817 | .661 | .812 | .660 | .809 | .653 | 44 |
| 12 | .360 | | .473 | .677 | .605 | .643 | .808 | .661 | .663 | .662 | .665 | .826 | .666 | .810 | .650 | .792 | 42 |
| 13 | .389 | | .578 | .587 | .616 | .791 | .654 | .809 | .817 | .819 | .820 | .666 | .812 | .644 | .778 | .625 | 40 |
| 14 | .437 | | .502 | .703 | .765 | .646 | .809 | .660 | .660 | .664 | .660 | .799 | .637 | .768 | .604 | .720 | 38 |
| 15 | .274 | .355 | .627 | .587 | .632 | .802 | .663 | .828 | .815 | .817 | .808 | .643 | .768 | .604 | .698 | .524 | 36 |
| 16 | .302 | .505 | .536 | .729 | .632 | .802 | .663 | .828 | .676 | .822 | .660 | .791 | .624 | .726 | .528 | .484 | 34 |
| | 1 | 3 | 5 | 7 | 9 | 11 | 13 | 15 | 17 | 19 | 21 | 23 | 25 | 27 | 29 | 31 | 0 |

CPRRAT

*Fig. 17*

SHUTDOWN MARGIN DISTRIBUTION

| | 2 | 4 | 6 | 8 | 10 | 12 | 14 | 16 | 18 | 20 | 22 | 24 | 26 | 28 | 30 | 32 |
|---|---|---|---|---|---|---|---|---|---|---|---|---|---|---|---|---|
| 2 | | | | | | | | | | | | | | | | |
| 4 | | | | | | | | | | | | | | | | |
| 6 | | | | | | 4.32 | 4.09 | 3.58 | 3.58 | 4.09 | 4.22 | | | | | |
| 8 | | | | 4.32 | 2.42 | 1.59 | 1.50 | 2.19 | 4.09 | 1.59 | 1.38 | 2.42 | 4.32 | | | |
| 10 | | | 1.99 | 1.49 | 1.39 | 1.88 | 1.84 | 1.45 | 1.88 | 1.59 | 1.62 | 1.49 | 1.99 | 4.32 | | |
| 12 | | | 1.50 | 1.57 | 1.62 | 1.88 | 1.84 | 1.85 | 1.88 | 1.88 | 1.62 | 1.57 | 1.50 | 2.41 | | |
| 14 | | | 1.63 | 1.94 | 1.82 | 1.99 | 1.95 | 1.81 | 1.83 | 1.99 | 1.82 | 1.94 | 1.63 | 1.38 | 4.22 | |
| 16 | | | 1.78 | 1.99 | 2.00 | 2.10 | 2.04 | 2.07 | 2.04 | 2.10 | 2.01 | 1.99 | 1.78 | 1.61 | 4.10 | |
| 18 | | | 1.86 | 2.05 | 2.04 | 2.13 | 2.11 | 2.18 | 2.11 | 2.13 | 2.04 | 2.05 | 1.85 | 1.67 | 3.59 | |
| 20 | | | 1.78 | 1.82 | 1.96 | 2.06 | 2.02 | 3.21 | 2.02 | 2.06 | 1.96 | 1.82 | 1.78 | 1.56 | 2.26 | |
| 22 | | | 1.86 | 2.05 | 2.04 | 2.13 | 2.11 | 2.18 | 2.11 | 2.13 | 2.04 | 2.05 | 1.85 | 1.67 | 3.59 | |
| 24 | | | 1.78 | 1.99 | 2.01 | 1.91 | 2.02 | 2.06 | 2.02 | 1.91 | 1.99 | 1.99 | 1.78 | 1.61 | 4.10 | |
| 26 | | | 1.63 | 1.94 | 1.82 | 2.10 | 2.04 | 2.07 | 2.04 | 2.10 | 1.82 | 1.94 | 1.63 | 1.38 | 4.22 | |
| 28 | | | 1.50 | 1.57 | 1.38 | 1.99 | 1.95 | 1.81 | 1.83 | 1.99 | 1.62 | 1.57 | 1.50 | 2.41 | | |
| 30 | | | 1.99 | 1.49 | 4.22 | 4.09 | 3.59 | 2.19 | 3.59 | 4.09 | 1.38 | 1.49 | 1.99 | 4.32 | | |
| 32 | | | 4.32 | | | | | | | | 4.22 | 2.42 | 4.32 | | | |

Fig. 18

SHUTDOWN MARGIN DISTRIBUTION

|    | 2 | 4 | 6 | 8 | 10 | 12 | 14 | 16 | 18 | 20 | 22 | 24 | 26 | 28 | 30 | 32 |
|----|---|---|---|---|----|----|----|----|----|----|----|----|----|----|----|----|
| 2  |   |   |   |   |    |    |    |    |    |    |    |    |    |    |    |    |
| 4  |   |   |   |   | 3.86 | 3.79 | 3.49 | 2.34 | 3.49 | 3.79 | 3.86 |    |    |    |    |    |
| 6  |   |   |   | 2.71 | 1.37 | 1.48 | 1.40 | 1.37 | 1.40 | 1.48 | 1.37 | 2.71 |    |    |    |    |
| 8  |   |   | 3.90 | 1.95 | 1.37 | 1.59 | 1.60 | 1.56 | 1.60 | 1.59 | 1.40 | 1.37 | 1.95 | 3.90 |    |    |
| 10 |   | 2.71 | 1.38 | 1.36 | 1.53 | 1.70 | 1.68 | 1.57 | 1.68 | 1.70 | 1.53 | 1.36 | 1.38 | 2.71 |    |    |
| 12 |   | 3.90 | 1.95 | 1.41 | 1.63 | 1.78 | 1.75 | 1.73 | 1.75 | 1.78 | 1.73 | 1.63 | 1.41 | 1.95 | 3.90 |    |
| 14 |   | 3.80 | 1.51 | 1.51 | 1.74 | 1.68 | 1.77 | 1.83 | 1.77 | 1.68 | 1.74 | 1.70 | 1.51 | 1.50 | 3.80 |    |
| 16 |   | 3.51 | 1.54 | 1.62 | 1.75 | 1.87 | 2.10 | 2.42 | 2.10 | 1.87 | 1.75 | 1.74 | 1.61 | 1.54 | 3.51 |    |
| 18 |   | 2.40 | 1.46 | 1.55 | 1.64 | 1.85 | 2.43 | 3.78 | 2.43 | 1.85 | 1.64 | 1.57 | 1.55 | 1.46 | 2.40 |    |
| 20 |   | 3.51 | 1.54 | 1.62 | 1.75 | 1.87 | 2.10 | 2.42 | 2.10 | 1.87 | 1.75 | 1.74 | 1.61 | 1.54 | 3.51 |    |
| 22 |   | 3.80 | 1.51 | 1.51 | 1.74 | 1.68 | 1.77 | 1.83 | 1.77 | 1.68 | 1.74 | 1.70 | 1.51 | 1.50 | 3.80 |    |
| 24 |   | 3.90 | 1.95 | 1.41 | 1.63 | 1.78 | 1.75 | 1.73 | 1.75 | 1.78 | 1.73 | 1.63 | 1.41 | 1.95 | 3.90 |    |
| 26 |   | 2.71 | 1.38 | 1.36 | 1.53 | 1.70 | 1.68 | 1.57 | 1.68 | 1.70 | 1.53 | 1.36 | 1.38 | 2.71 |    |    |
| 28 |   |   | 3.90 | 1.95 | 1.37 | 1.59 | 1.60 | 1.56 | 1.60 | 1.59 | 1.40 | 1.37 | 1.95 | 3.90 |    |    |
| 30 |   |   |   | 2.71 | 1.37 | 1.48 | 1.40 | 1.37 | 1.40 | 1.48 | 1.37 | 2.71 |    |    |    |    |
| 32 |   |   |   |   | 3.86 | 3.79 | 3.49 | 2.34 | 3.49 | 3.79 | 3.86 |    |    |    |    |    |

SINGLE CYCLE AND EQUILIBRIUM FUEL LOADING METHOD AND SYSTEM TO REDUCE CYCLE OUTAGE IN A BOILING WATER NUCLEAR REACTOR

BACKGROUND OF THE INVENTION

The present invention relates to fuel core loading for refueling a boiling water nuclear reactor (BWR). In particular, the invention relates to core loading strategies for the removal of expired ("burnt") fuel bundles, installing fresh fuel bundles and shuffling existing fuel bundles to be reused in the core during a subsequent fuel cycle.

The core of a BWR comprises an array of fuel bundles. Each fuel bundle houses an array fuel rods formed of radioactive material. The bundles are arranged in the core based on design constraints such as radioactivity exposure limits for each bundle. The radioactivity of the core heats the water in the reactor. The reactor typically operates on a fuel cycle having a cycle period of, for example, a (1) year, year and a half (1.5) or two (2) years. At the end of each fuel cycle the reactor is shut down to refuel, maintain and repair on the core and reactor vessel. During refueling, fuel bundles are removed from the core, bundles to be reused are left in their current core location or shuffled to a new core for the next cycle, and fresh fuel bundles are installed in the core.

Cranes over the reactor vessel move fuel bundles during the fuel loading operation. To move an existing bundle, the crane is positioned over the bundle; captures the bundle; elevates the bundle out of the core; moves the core to a pool or to a new core location, and lowers the bundle to the pool or new core location. Several minutes are typically needed to move each fuel bundle by crane. During a single core loading process, some of the bundles are moved twice, e.g., from a core location to a pool and back to a new core location. In the past, core loading plans and maps have been complex and involved moving most fuel bundles in a core.

There are several hundred bundles in a core. To move all or just most of the bundles can require many days. The fuel loading process has often required seven to fourteen days to complete, and rarely has been completed in less than three days. Although bundle placement mistakes are rare, the risk of placing a bundle at an incorrect core position increases with the number of bundles to be placed. There is a long felt need to reduce the number of bundles to repositioned, e.g., shuffled, in a core.

Fuel bundles are arranged in a core pursuant to a core loading strategy. A workable core loading strategy typically ensures that the core and fuel bundles adhere to thermal margins (e.g., heating in critical power ratio (CPR) and along the length of individual bundles (kw/ft)) and reactivity margins (e.g., hot excess (HOTEX), shut down margin (SDM), and end of cycle (EOC) energy)). Shuffling fuel bundles during refueling is often used to meet thermal and reactivity margins for the core and individual bundles. The core loading strategy may also ensure that fuel bundles do not exceed the excessive limits. The core loading strategy also determines the location of location and type of fresh fuel bundles to be loaded during each refueling operation.

It has not been uncommon for a conventional core loading strategy to shuffle most or all of the exposed fuel bundles to be reused. Extensive bundle shuffling was done to provide appropriate thermal and reactivity margin limits. Excessive shuffling increases the time needed to refuel a core and increase the risk that bundles will be placed in an incorrect core location.

A core strategy may have as a design target an "equilibrium" core that adheres to the thermal and reactivity margins and other core design criteria. An equilibrium core has minimal changes in the loading of its core fuel and the exposures of bundles in the core between successive fuel cycles. An equilibrium strategy promotes use of the same fuel bundle loading plan, fresh fuel definitions and rod pattern depletions from cycle to cycle. An equilibrium approach to core loading minimizes the core locations: from which burnt bundles are to be removed, fresh bundles are to be inserted and from which bundles to be shuffled are taken and placed does not significantly change from one core loading cycle to another. Equilibrium typically requires several fuel loading cycles, e.g., 8 to 10 cycles, to achieve. The equilibrium core loading plan represents a desired target to be achieved in a core loading strategy that extends over many fuel cycles. The "equilibrium" strategy assists vendors and customers to develop a long-term core loading strategy for economic and scheduling considerations. An equilibrium core loading plan may be used to compare one core loading strategy to another.

To reduce the time needed to load fuel bundles, a method and system are needed for reduce the fuel bundles to be moved during each refueling operation. A method and system for fuel loading should take into account a core loading strategy for fresh fuel bundles, removal of burnt fuel bundles and reuse of bundles during two or three successive fuel cycles. Selecting burnt bundles to be removed, identifying existing bundles to be shuffled and determining their new core locations, and selecting fresh bundles and identifying their core locations are determined by a core loading strategy.

There is a long felt need for a core loading strategy that simplifies the core loading process and reduces the time needed to remove, shuffle and load fuel bundles in a core. There is also a long felt need for a core loading strategy that achieves equilibrium in a reduced number of loading cycles and an equilibrium having a small change in core loading between successive loading cycles.

BRIEF DESCRIPTION OF THE INVENTION

A method has been developed for generating fuel loading maps for a core in a nuclear reactor, wherein the core includes an array of fuel locations, the method comprising: defining an even cycle fuel bundle shift map of fuel bundles to be shifted to another core location during an even fuel loading cycle; defining an odd cycle fuel bundle shift map of fuel bundles to be shifted to another core location during an odd loading cycle, wherein the odd cycle and even cycle are alternative and successive core refueling cycles; defining a discharge map identifying the another locations to receive the bundles from the locations identified in the even and odd cycle fuel bundle shift maps, and generating shuffling instructions indicating which fuel bundles from a prior fuel cycle are to be shifted to one of the another locations of the core for a subsequent fuel cycle, wherein bundles to be shifted during the even fuel loading cycle are selected from the fuel bundles to be shifted identified in the even cycle bundle shift map and bundles to be shifted during the odd fuel loading cycle are selected from the fuel bundles to be shifted identified in the odd cycle bundle shift map.

The method may further include arranging the even cycle shift map and odd cycle shift maps to identify locations of fuel bundles having previously undergone two fuel cycles, and the discharge map identifies core locations to receive fuel bundles to undergo a third fuel cycle. The method may include the additional steps of: defining an even fresh fuel loading map for the core, where the map identifies locations for fresh fuel bundles in each even fuel loading cycle; defining an odd fresh fuel loading map for the core, where the map identifies locations for fresh fuel bundles in each odd fuel loading cycle, and generating fresh fuel loading instructions based on the even fresh fuel loading map for the even fuel loading cycle and generating fresh fuel loading instructions based on the odd fresh fuel loading map for the odd fuel loading cycle.

A method has been developed for developing an equilibrium core loading strategy for a nuclear reactor, where the core includes an array of fuel locations, the method comprising: generating a fuel loading map for an even fuel loading cycle based on an even cycle fresh fuel loading template, an even cycle bundle shift template identifying fuel locations from which bundles are to be shifted, and a discharge map identifying fuel locations from which twice used fuel bundles are to be removed during the even fuel loading cycle; generating a fuel loading map for an odd fuel loading cycle based on an odd fresh fuel loading template, an odd shift template, and the discharge map identifying fuel location from which twice used fuel bundles are to be removed during odd fuel loading cycle, wherein the odd fuel loading cycle alternates with and is successive with the even fuel loading cycle; generating an even cycle fuel bundle exposure map based on the generated even cycle fuel loading map and data regarding exposure levels for each fuel bundle identified in the even cycle fuel loading map; generating an odd cycle fuel bundle exposure map based on the generated odd cycle fuel loading map and data regarding exposure levels for each fuel bundle identified in the odd cycle fuel loading map; repeating the steps of generating fuel loading maps and fuel bundle exposure maps for at least two successive loops of even and odd fuel loading cycles; comparing the even cycle fuel bundle exposure maps for two successive even cycles, and determining if exposure maps converge by being within a predetermined level of similarity; if the successive even cycle fuel bundle exposure maps do not converge, repeating the steps of generating fuel loading maps and fuel bundle exposure maps for at least two successive loops of even and odd fuel loading cycles and comparing successive even cycle fuel exposure maps, and if the successive even cycle funnel do converge, reporting an equilibrium fuel loading strategy for the core.

A group of core maps have been developed for a nuclear reactor, each core map identifying locations in the core for a nuclear fuel bundle, the maps comprising: an even cycle fresh fuel map of core locations to receive a fresh fuel bundle; an odd cycle fresh fuel map of core locations to receive a fresh fuel bundle, wherein the odd cycle and even cycle are alternative and successive core refueling cycles; an even cycle shift map of bundles to be shifted to another location; an odd cycle shift map of bundles to be shifted to another location, and a discharge map identifying the another locations to receive the bundles from the locations identified in the even and odd cycle shift maps. The even cycle shift map and odd cycle shift maps identify locations of fuel bundles having previously undergone two fuel cycles, and the discharge map identifies core locations to receive fuel bundles to undergo a third fuel cycle. Further, the even cycle shift map may be a subset of the even cycle fresh fuel map, and the subset is arranged radially outward in the core with respect to fresh fuel locations in the fresh fuel map which are not within the subset.

The sum of both all core locations identified to receive fresh fuel bundles in the even and odd cycle fresh fuel maps and all core locations identified for discharge in the discharge map is equal to a total of all fuel bundle locations in the core. The fuel bundle locations identified to be shifted in the even cycle shift map may be at the same locations of the fuel bundles identified to not be shifted in the odd cycle shift map. In addition, the only fuel bundles identified in the even and odd cycle shift maps are to be shifted to another core location during a successive even and odd fuel loading cycles.

BRIEF DESCRIPTION OF THE DRAWINGS

FIGS. 2 and 3 are schematic diagrams of quarter sections of the core, wherein FIG. 2 shows an "odd" fresh fuel bundle loading pattern and FIG. 3 shows an "even" fresh fuel bundle loading pattern.

FIG. 7 is a flow chart of a method for BWR cycle to cycle actives.

FIG. 8 is a flow chart of an exemplary embodiment of the shuffling algorithm.

FIG. 9 is an exemplary set of control inputs for the shuffle algorithm.

FIGS. 10 and 11 are exemplary sets of core loading strategy maps used as inputs to the shuffle algorithm.

FIGS. 12 and 13 are exemplary end of cycle exposure maps for an odd and even core loading scheme, respectively.

FIGS. 14 and 15 show exemplary beginning of cycle core maps that indicate the exposure margin for each bundle, these figures show that with the shuffling algorithm disclosed herein the exposure margin for nearly all bundles are relatively close to a design exposure margin of 10%.

FIGS. 16 and 17 are exemplary end of cycle (EOC) core maps that indicate the critical power ratio (CPR) margin for each bundle, these figures show that with the shuffling algorithm disclosed herein the CPR margin for nearly all bundles are relatively close to a design exposure margin of 15%.

FIGS. 18 and 19 are exemplary beginning of cycle (BOC) and middle of cycle (MOC), respectively, charts of an entire core of the shut down margins of each fuel bundle in the core.

DETAILED DESCRIPTION OF THE INVENTION

Figure 1:
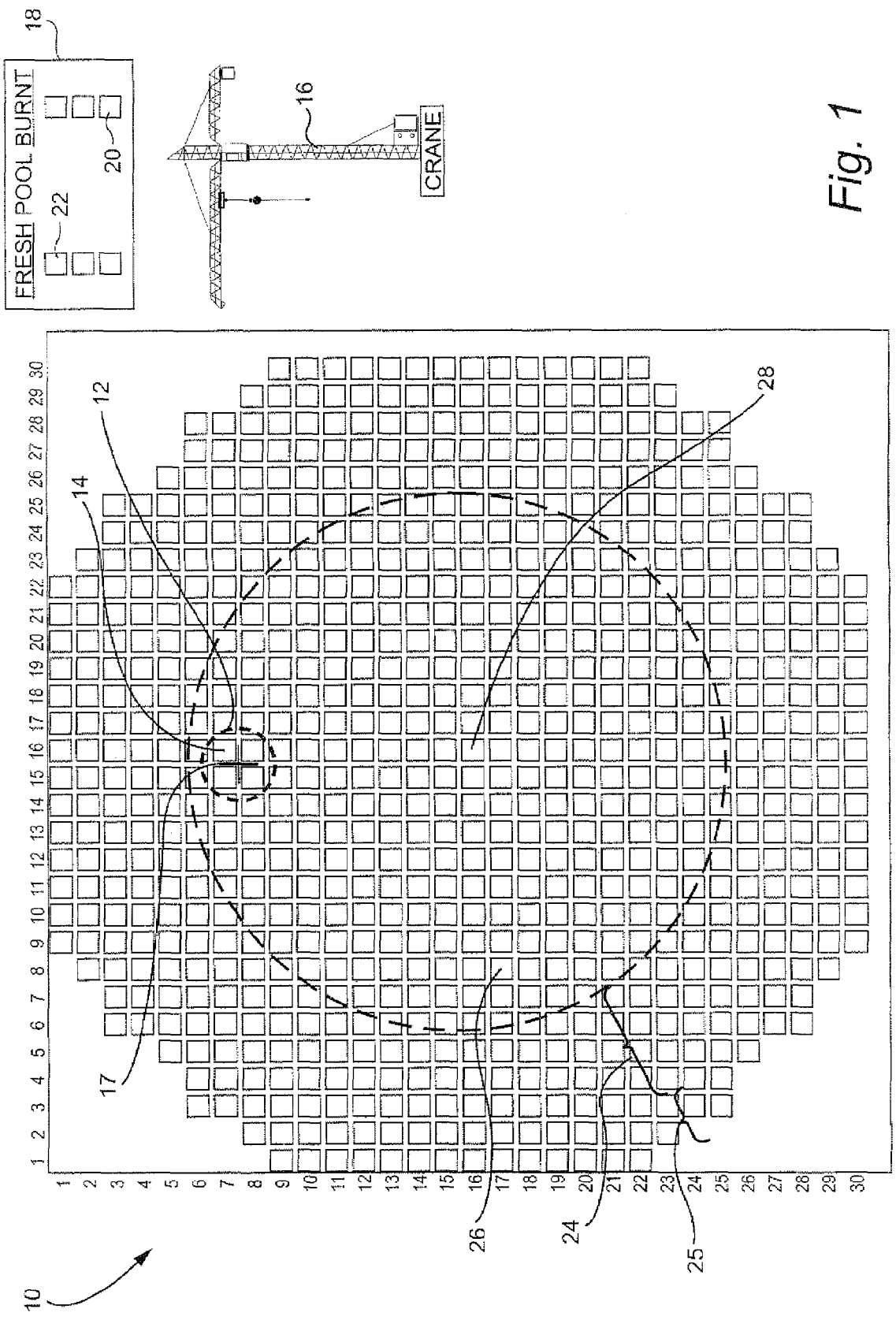
FIG. 1 is a schematic diagram of a core of a BWR.

FIG. 1 is a top down two-dimensional schematic of the core 10 of BWR. The core includes hundreds of control cells 12 (indicated by a dotted line circle). Each control cell includes four fuel bundles 14 arranged around a control blade 17. For simplicity of illustration, only one control blade is shown and only one control cell is designated in FIG. 1. In a typical core, all or most of the fuel bundles are arranged in control cells. The core 10 is arranged in a two-dimensional array in which each fuel bundle is assigned a specific array location.

The bundle locations in the core are determined by a core loading plan that is executed during core loading while the BWR is off-line and the core is accessible for removing expired fuel bundles, loading fresh fuel bundles and shuffling bundles to be reused in the next cycle. A crane 16 over the core moves each fuel bundle to its proper location in the core. The crane typically moves fuel bundles sequentially, e.g., one at a time. A pool 18 near the reactor core is used to temporarily store fuel bundles. The crane is moved to the pool to discard burnet fuel bundles and grasp fresh bundles.

The movements between the core and pool are relatively long (as compared to between core bundle locations) and require relatively long periods of crane movement. Similarly, for the crane to traverse large areas of the core requires longer periods of crane time than do crane movements between adjacent or nearby fuel bundle locations in the core. Reducing the number of crane movements between the pool and core and across large areas of the core will typically result in a reducing of the total time needed to load fuel bundles in a core.

Disclosed herein is a shuffling algorithm that reduces: the number of bundles to be shuffled, the trips between a core and a pool, and the average distance traveled across the core during each crane movement. The shuffling algorithm, for example, generates a core map, e.g., FIGS. 2 and 3, identifying the core locations of burnt fuel bundles to be removed from the core and moved to the pool and the core locations to receive fresh fuel bundles. A majority of fresh fuel bundles are to be placed at core locations where burnt fuel bundles are to be removed. The crane 16 removes a burnt fuel bundle from the core, moves to the pool 18 wherein the burnt fuel bundle is placed in the core at 20, grasps the fresh fuel bundle 22 intended for the newly vacated core location from the pool, and moves back to the core to install the fresh bundle in the same core location from which the burnt fuel bundle was removed a few minutes ago. In one trip between the core and pool the crane has deposited a burnt fuel bundle in the pool and grasped a fresh bundle for the core. The core map generated by the shuffling algorithm reduces the trips between the pool and core by scheduling the crane to drop off a burnt bundle and pick up a fresh bundle during each trip.

The risk of placing the fresh bundle in the wrong core location is minimized because only one fuel bundle location is vacant in the core. The crane alternates between removing a burnt fuel bundle and installing a new fuel bundle. The crane need not remove multiple burnt fuel bundles and thereby leave vacant multiple core locations. Having multiple vacant fuel bundle core locations increases a risk that a fuel bundle will be placed in the wrong core location.

The period needed to load a core depends, in part, on the number of fuel bundles to be shuffled from one core location to another. The period needed to load a core can be significantly reduced, e.g., by more than 50% of the shuffling time and as much as 85%, if the number of fuel bundles to be shuffled is reduced such that a large portion, e.g., more than 50%, of the bundles to be reused are not moved from one core location to another during fuel loading.

The shuffling algorithm disclosed herein reduces the number of fuel bundles to be shuffled. A shuffle is the transfer of a fuel bundle used in a prior loading cycle to a new core location for a subsequent loading cycle. The number of shuffles is reduced, in part, by replacing most burnt fuel bundles with fresh fuel bundles. The removal of burnt bundles and installation of fresh bundles does not require shuffling.

The shuffling algorithm further reduces the number of shuffle operations by confining most shuffles to an outer annular region 24 of the core. The outer annular region 24 may be defined by those fuel bundles to be used in at least three fuel loading cycles. The outer core annular region does not include core locations at the perimeter 25 of the core, where fuel bundles are placed for a third fuel cycle.

During a refueling operation, the fuel bundles in the outer annular region 24 either remain in the same core location from the last fuel cycle or are shuffled to a core location at the perimeter 25 of the core. A fresh fuel bundle is placed in a core location where a bundle removed to be shuffled to the perimeter. A fresh fuel bundle in the outer core region 24 remains in the same core location for two cycles and is then shuffled to a location in the perimeter for a third fuel cycle.

In the outer core region 24, the exposure to radioactivity of a fuel bundle during reactor operation is less than for bundles in a central core region 26. The operational life of a fuel bundle is dependent on its exposure level and operational time in the core. A fuel bundle with a high exposure level (as occurs in the center region 26) has an operational life of two fuel loading cycles because the reach a maximum acceptable levels of exposure in just two fuel cycles. Fuel bundles in the central core region 26 may not be used for three fuel cycles. Fuel bundles in the outer core region 24 receive less exposure to radioactivity. Fuel bundles in the outer core region have a longer operation time of three fuel loading cycles.

The central core region 26 inward of the outer annular region is comprised of fuel bundles having a life of only two fuel loading cycles. Using the shuffling algorithm, fuel bundles in the center core region are not shuffled, except for the bundles 28 at the center of the core. The fuel bundles in the central core region are either removed and replaced with a fresh bundle, or remain in their current core location for a second fuel cycle. The center fuel bundle(s) 28 is typically shuffled during each loading cycle due to the high exposure level of a bundle(s) at the center of the core.

During each refueling, half of the fuel bundles in the central core region 26 (other than the center bundles 28) are replaced and the other half of the bundles are not moved. The half of fuel bundles moved during each core loading operation switches during each successive loading operation. For example, fuel bundles at alternate core locations may be removed in the center core.

Figure 2:
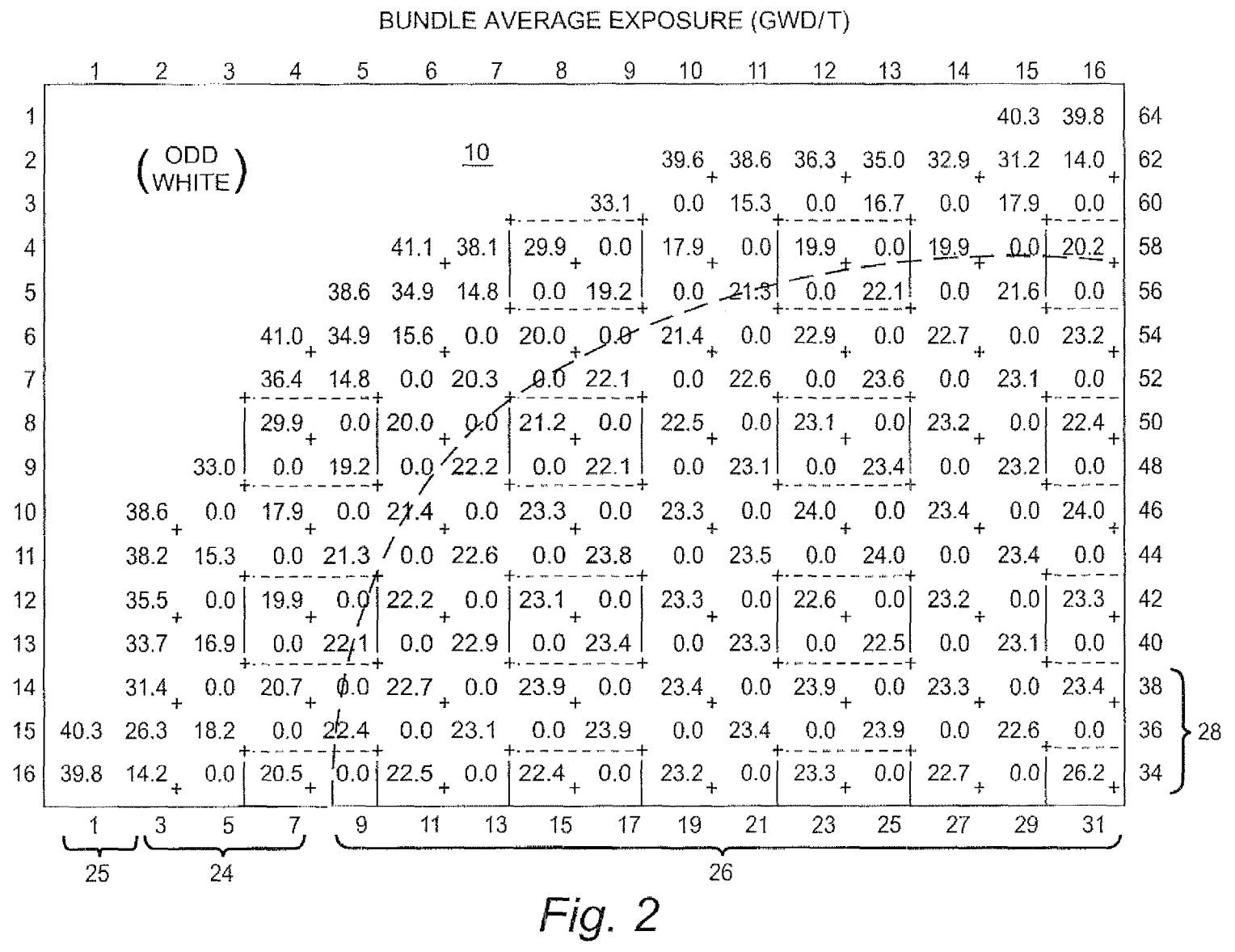

FIGS. 2 and 3 show quarter sections of a core 10 and illustrate an exemplary loading pattern for the center core region 26 wherein half of the fuel bundle locations are removed and replaced during each core loading operation. The core shown in FIGS. 2 and 3 is the same core. FIG. 2 shows the bundles at the BOC of one cycle, e.g., an odd cycle, and FIG. 3 shows the same core at the BOC of the next cycle, an even cycle. FIGS. 2 and 3 show the fuel bundle average exposure (GWD/T) for each bundle at the beginning of a cycle (BOC). Fresh bundles are designated by "0.0" because they have had no exposure. Bundles to be reused have an exposure value above zero, e.g., 23.2, 22.5 and 39.8, and well below the maximum BOC exposure threshold, e.g., 40.0. These BOC exposure values indicate the amount of radioactivity exposure of the bundle during the previous one or two cycles. At the BOC, exposed bundles in the center region 26 were in the core during the prior fuel cycle. Exposed bundles in the outer core region 24 may have been in one or two prior fuel cycles.

Design constraints impose exposure limits for each bundle at the BOC. The exposure limit varies for each bundle and bundles towards the perimeter having a higher BOC exposure limit, e.g., above 40.0, and bundles in the center of the core have a lower BOC exposure limit, e.g., 24.0. The BOC exposure limit may be determined such that a bundle has an exposure of no more than an exposure limit, e.g., 44.0, at the end of cycle (EOC).

The pattern of fuel bundles to be removed from the center core region 26 may be similar to a checker-board pattern wherein "white" locations on the pattern alternate with "black" locations on the pattern. During one core loading operation, fuel bundles at "white" locations from the center core region remain in place and fuel bundles at "black" locations are moved to the pool 18 and replaced with fresh fuel bundles 22. During the next core loading operation, fuel bundles at "black" locations from the center core region remain in place and fuel bundles at "white" locations are moved to the pool 18 and replaced with fresh fuel bundles 22.

The core loading of the center core region 26 switches back and forth from white to black during each successive core loading operation.

Similarly, the fuel bundles in the outer core region 24 (not including the perimeter 25) may be arranged in a checkerboard pattern in which fuel bundles on the "white" locations are shuffled to the perimeter for a third cycle and replaced with fresh bundles, and the bundles in the "black" locations are left in place for a second cycle. In the next cycle, the bundles at the white locations are left in place for a second cycle and the bundles in the black locations are shuffled to the perimeter and replaced with fresh bundles.

FIGS. 2 and 3 are BOC core exposure maps that show fresh fuel bundles (0.0) arranged in a checker-board pattern in the central core region 26. A comparison of FIG. 2 and FIG. 3 shows that the locations of the fresh bundles switch on the checkerboard pattern. FIG. 2 may be used to map fresh fuel bundle locations for one core loading operation and FIG. 3 be used to map fresh fuel bundle locations for the next core loading operation. The next sequential core loading operation (third operation) would have a fresh cores being loaded in the locations shown in FIG. 2 at the center core region 26.

An alternative designation for the white and black locations in the core is to refer to the core locations as odd and even locations. The core locations can be identified by reference to the coordinate numbers 1 to 30 along the left and top margins of the core diagram shown in FIG. 1. For example, the center bundle location 28 is designated as the 16-16 location. An even core location is designed by a pair of coordinate numbers that are both even or both odd. An odd core location is designated by a pair of coordinate numbers including one odd and one even number.

In a first fuel loading cycle, fuel bundles at odd core locations (FIG. 2) in the central region 26 and outer core region 24 (not including the center bundles 28 and the bundles at the perimeter) are not moved during a core loading operation. Bundles at even core (FIG. 3) locations in the central region 26 are removed and replaced with a fresh bundle and in the outer core region 24 the bundles are shuffled to the perimeter. During the next fuel loading operation (which occurs after one fuel loading cycle), bundles at even core locations in the central and outer regions 24, 26 are not moved during a core loading operation. During the odd fuel loading cycle, bundles at odd core locations in the central region are removed and replaced with a fresh bundle and at the outer core region the bundles are moved to the perimeter.

Bundles at the perimeter are moved to the pool in each refueling cycle. Bundles at the center 28 of the core are either shuffled to the perimeter or moved to the pool. With the shuffling algorithm disclosed herein, the bundles to be shuffled are limited to one-half of the bundles in the outer core region 26 and possibly the bundles at the center 28 of the core.

The even-odd (black vs. white) core loading strategy for replacing fuel bundles has been used in the prior art. To the best of the inventor's knowledge, prior uses of the even-odd core loading strategy where not in conjunction with a prescribed shuffling algorithm that generated core loading plans for a series of fuel loading cycles and were not part of an algorithm that generated a core loading a strategy for multiple fuel loading cycles or to achieve equilibrium.

Using the shuffling algorithm disclosed herein, the fuel bundles in the outer core region 24 are typically shuffled. Fuel bundles in the inner core region 26 are typically not shuffled, with the exception of the center fuel bundle location(s) 28 which is/are shuffled during every fuel loading operation. Accordingly, shuffling is primarily performed on a reduced set of core locations and in a confined area of the core.

Figure 4:
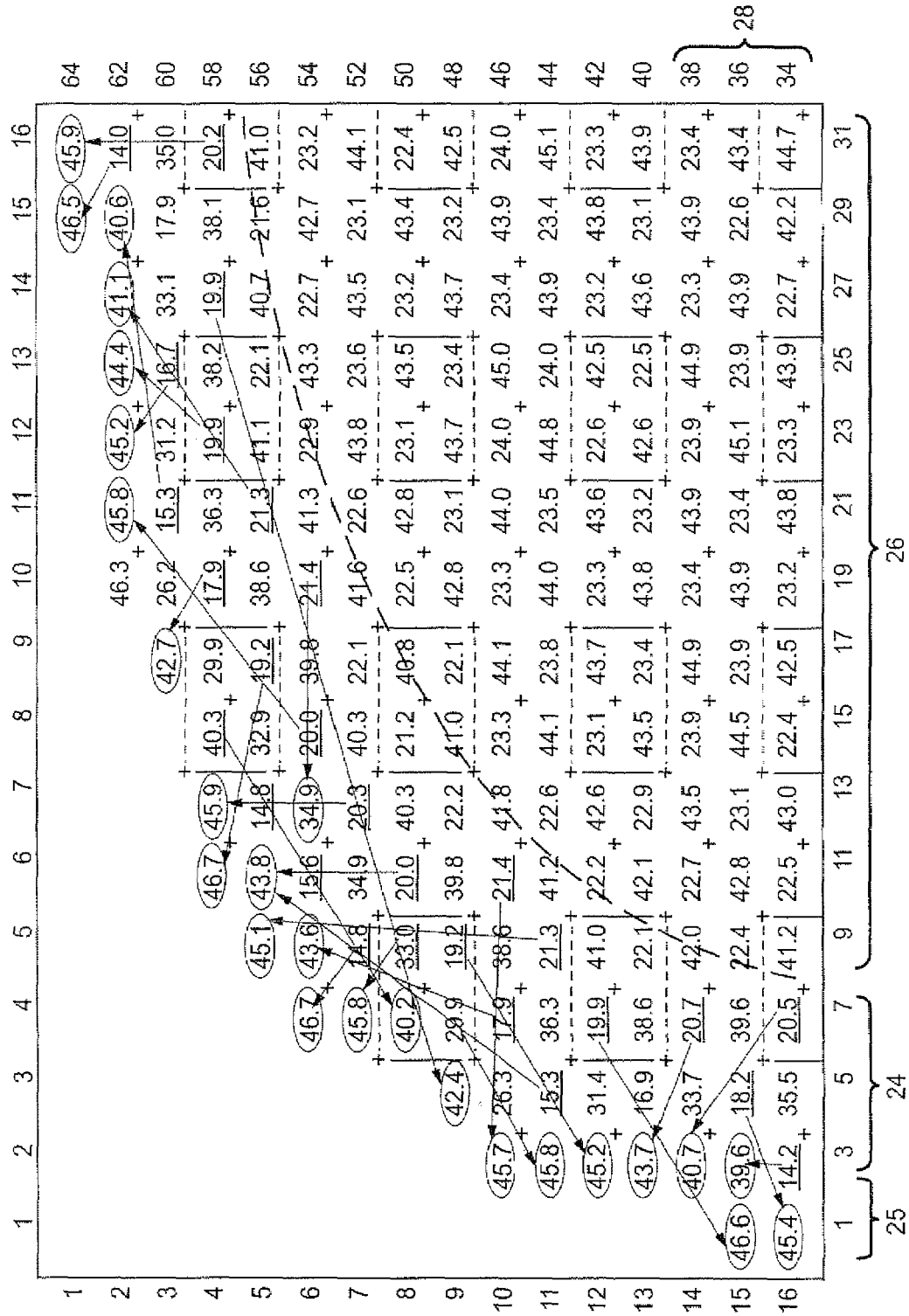
FIG. 4 is a map of a quarter core section showing lines indicating a shuffling pattern for fuel bundles, wherein the map is generated using the shuffling algorithm disclosed herein.

FIG. 4 is an exemplary map of a quarter section of the core with lines indicating fuel bundles to be shuffled from one core location to another. Not all shuffling lines are shown to reduce the clutter in the figure. The bundles to be shuffled are underlined and the twice burnt bundles to be replaced by the shuffled bundles are circled, in FIG. 4. The map shows that the fuel bundles to be shuffled are largely confined to the outer core region 24 and that relatively few bundles are shuffled as compared to the conventional shuffling shown in FIG. 5. The shuffling map shown in FIG. 4 was generated using the shuffling algorithm disclosed herein.

Figure 5:
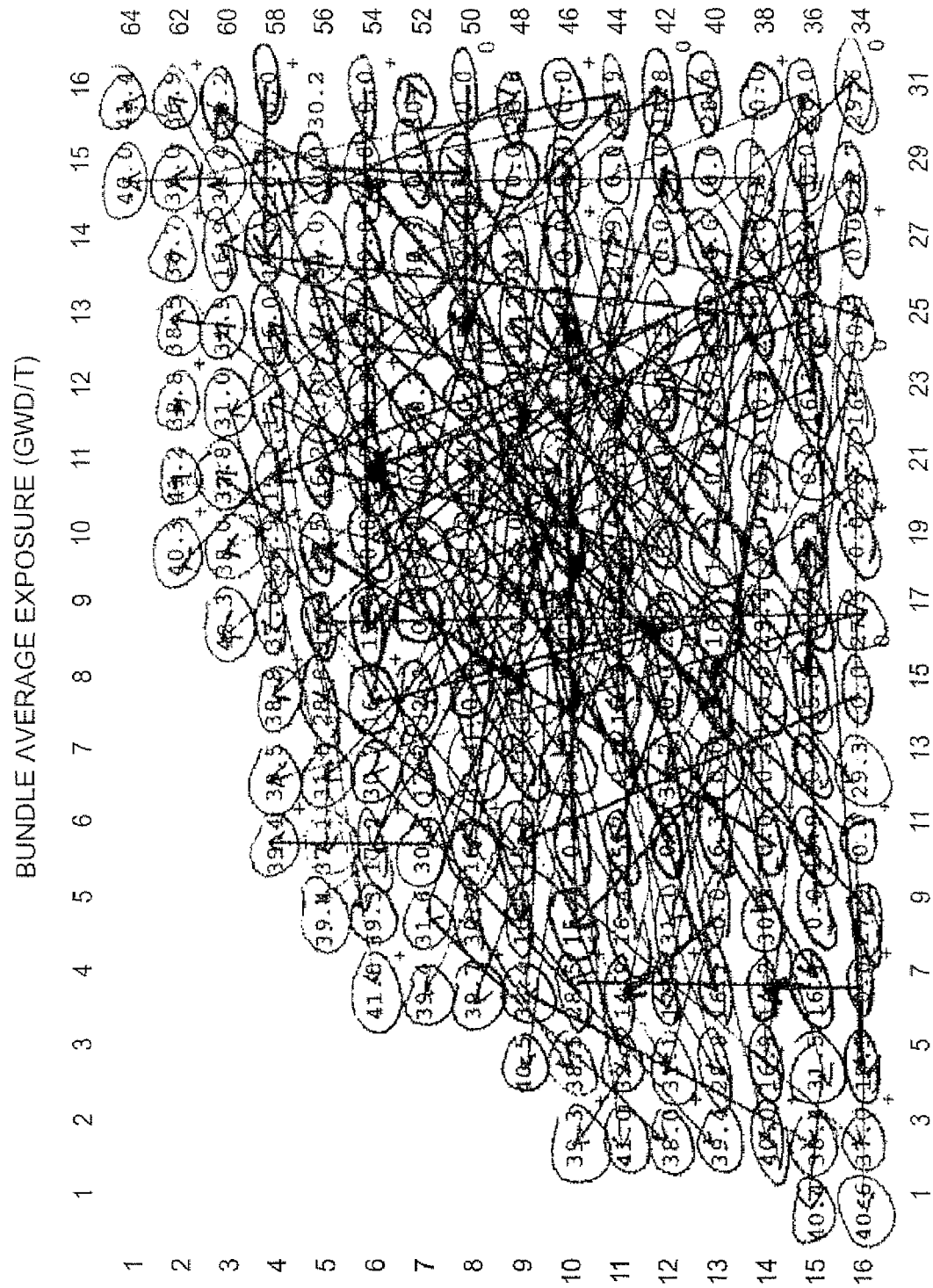
FIG. 5 is a map of a quarter core section showing lines indicating a shuffling pattern for fuel bundles, wherein the map was made using a conventional approach to fuel loading.

FIG. 5 shows, by way of contrast, a conventional shuffling map with lines indicating the bundles to be move from one core location to another. This conventional shuffling map has a substantially greater number of bundles being shuffled and bundles traversing a greater distance across the core, than the shuffling map shown in FIG. 4. While conventional techniques have not always shuffled as many fuel bundles as shown in FIG. 5 (especially with respect to the odd vs. even conventional approach to fresh bundle loading), FIG. 5 is representative of the massive shuffling of fuel bundles that is conventionally performed during fuel loading cycles.

A comparison of FIGS. 4 and 5 shows a reduction in the number of bundle shuffles in a refueling strategy generated by using the shuffling algorithm disclosed herein as compared to the number of shuffles shown in FIG. 5. The number of shuffles was reduced substantially, e.g., by approximately 86%, by using the shuffling algorithm disclosed herein to generate the shuffle map shown in FIG. 4 as compared to the shuffle map shown in FIG. 5. Furthermore, the shuffles that are shown in FIG. 4 require the bundles to travel relatively short distances across the core, as compared to the distances of the shuffles shown in FIG. 5. By reducing the number of shuffles and the shuffle distances, the outage time due to fuel loading can be reduced by several days, e.g., a three to five day savings. It is estimated that some BWRs produce $1 million USD in revenue per day. Using that estimation, reducing the outage time by three days adds an additional $3 million USD in revenue for each fuel loading cycle of the BWR.

Figure 6:
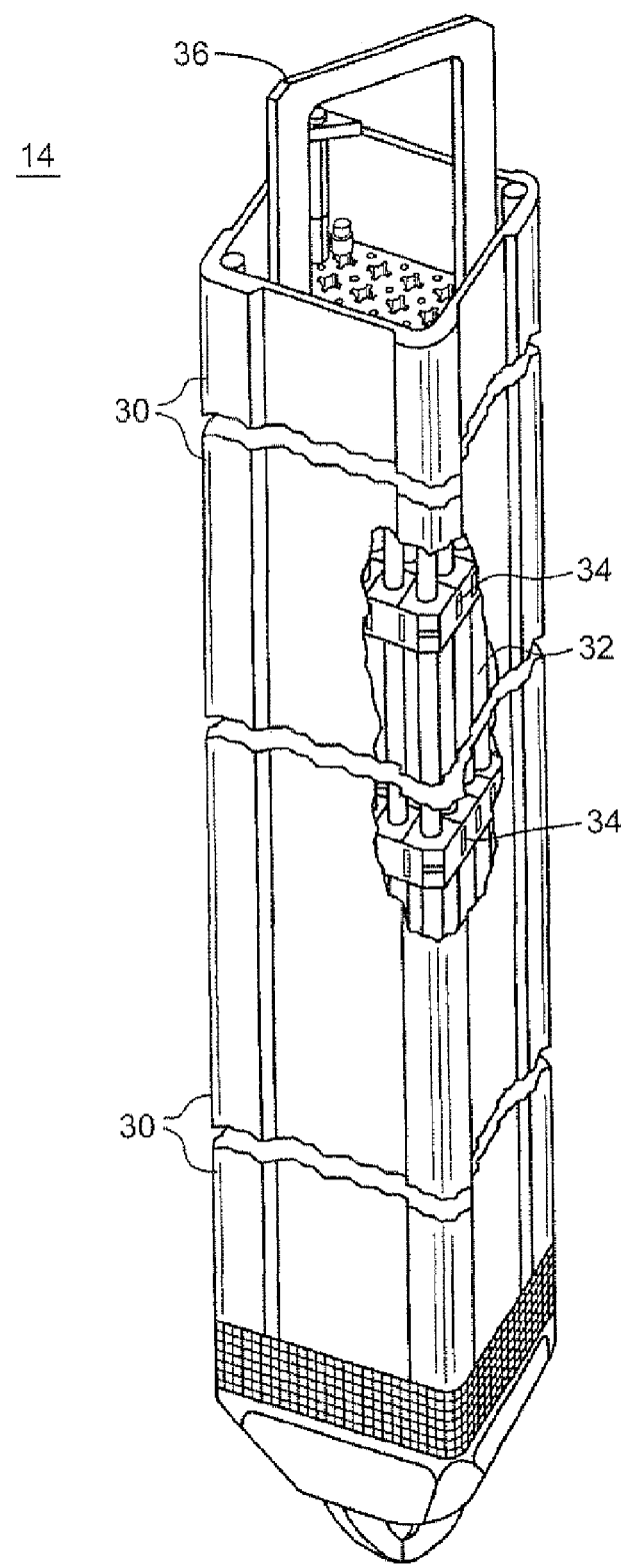
FIG. 6 is a perspective view of an exemplary fuel bundle.

FIG. 6 illustrates an exemplary fuel bundle 14. A core typically includes 200 to 1200 fuel bundles. Each bundle includes an outer channel 30 surrounding a plurality of fuel rods 32 extending generally parallel to one another in a generally rectilinear matrix of fuel rods. The rods 32 are laterally spaced from each other by spacers 34 at various vertical elevations along the length of the fuel rods and channel. The bundle includes a handle 36 that is hooked by a crane to lift the bundle out of a core or pool, move the bundle into position over the core, and lower the bundle into a new position in the core or pool.

Each fuel bundle 14 may have particular operating characteristics, e.g., thermal and reactivity margins. The characteristics of the bundle depend on the types and arrangements of fuel rods loaded into the bundle. Because of the bundles have different characteristics, e.g., fuel rod composition, one bundle cannot necessarily be readily substituted for another bundle. Fuel bundles having the same characteristics are referred to as being of the same type. A core typically has several types of fuel bundles, e.g., seven or more. A determination is made as to which type of fuel bundle is to be at each fuel bundle location. This determination may be made outside the shuffling algorithm. An input matrix may be provided as an input to the shuffling algorithm. An exemplary input matrix is shown at 82 in FIG. 10. The input matrix specifies a fuel bundle type, e.g., 1 to 7, for each bundle location in the core. The input matrix is a constraint on the shuffling algorithm. The algorithm generates a core loading strategy that the schedules for loading bundles having the fuel type specified in the input matrix for each core location.

FIG. 7 is a flow chart 50 of a method for BWR cycle to cycle outage actives. A BWR produces steam for power generation during an operational period of typically one to two years, e.g., 12 to 24 months, in step 52. A scheduled outage of the BWR occurs at the end of each fuel cycle (EOC). After the reactor is shutdown, the reactor vessel is dissembled, step 54, to open the reactor core for maintenance, repair and fuel loading. The reactor disassembly is typically a three to four day process. Once the reactor is accessible, maintenance is performed on control bars and other components of the core. Fuel bundles may be removed, step 56, to provide access to the control bars and other components to be inspected, repaired and replaced, step 58. Typically, three to five days are required to remove the fuel bundles and to inspect, repair and replace components of the core in steps 56 and 58.

The core is ready for the fuel loading process after the maintenance activities are completed on the core. In step 60, burnt fuel bundles (e.g., bundles at or near an EOC exposure limit, e.g., 44.0) are removed from the core, fresh bundles are loaded in the core, and bundles to be reused are left in their current core position or shuffled to a new position. A crane(s) is typically used to move fuel bundles between the core and a pool and to shuffle bundles to new locations in the core. Whereas a conventional fuel loading operation for moving fuel bundles typically requires seven to fourteen days, the movement of fuel bundles can be reduced to three days (and even fewer days) using the shuffling algorithm disclosed herein. The shuffling algorithm may be used to reduce the number of bundles to be shuffled and reduce the distance that shuffled bundles are moved across the core. It is believed that the shuffling operation may be reduced to a one-half day operation, as compared to a three to seven day operation in a conventional loading operation that does not use the shuffling algorithm disclosed herein.

After the fuel bundles are loaded in the core and all maintenance and inspection operations are completed in the core, the reactor vessel is assembled, in step 62. The reactor executes a startup procedure, in step 64, and begins the next cycle. At the start of the next cycle the core is at the beginning of the cycle (BOC). The reactor produces power for another one to two years, in step 52, such that the fuel cycle repeats. The fuel cycle repeats through the life of the BWR. The shuffling algorithm disclosed herein simulates the cycles of the BWR and looks forward to an equilibrium cycle in which the fuel maps between similar cycles in time and loading strategy have minimal differences there between. The equilibrium fuel loading map is a target used for the fuel loading strategy.

FIG. 8 is a flow chart of an exemplary embodiment of the shuffling algorithm 70 disclosed herein. The shuffling algorithm 70 herein may be part of a process, method, and design strategy for producing core loading program that minimizes shuffling of fuel bundles between sequential fuel loading cycles of a BWR. The algorithm 70 may be coded into an executable computer program that provides user input control of key operating parameters. The computer program may be executed on a computer used to develop core designs for the BWR.

The shuffling algorithm generates alternative core fuel loading maps to be used for successive core loading cycles. The core maps have center regions and outer core regions in which the locations of fresh fuel bundles and of bundles to be retained for a second cycle are arranged in patterns. These loading patterns for the core center region may invert from one loading cycle to another. A comparison of FIGS. 2 and 3 show examples of core loading maps for successive core loading cycles. The core loading maps in FIGS. 2 and 3 each having a center region 26, and the core loading is limited to removing burnt bundles and installing fresh bundles at the same locations from which the burnt bundles were replaced. The fresh bundle loading pattern is a mirror image of the loading pattern in FIG. 3.

Defining a center core region in which bundles are not shuffled excludes from shuffling a large portion of the core location, e.g., approximately 86% of all core locations. Segmenting the core into an outer annular region 24 wherein bundles are shuffled and a center core region 26 wherein bundles are not shuffled (except for at the core center 28) reduces the number of shuffles to be performed in each core loading operation and reduces the time needed for the shuffling operation.

FIG. 9 is a chart of an example of the control inputs 74 for the shuffle algorithm 70. The control inputs are loaded into the algorithm to define the core for the algorithm, in step 72. The control inputs may prescribe the number of: columns and rows in a quarter section of a core, fresh bundles to be loaded into the quarter core section during each loading cycle, total number of bundles in the quarter section of the core, and thermal hydraulic type. The thermal hydraulic type is an input designating the type of fuel bundles in the core and may be specified by the user. The inputs 74 may also specify the number of fuel loading cycles, e.g., two, that comprise a loop. FIGS. 2 and 3 show a two cycle loop in which every other fresh fuel loading map is substantially similar. A loop is the sequence of fuel loading cycles used to vary the pattern of loading fresh fuel bundles.

The user may also specify whether the core loading map is to be an "odd" or "even" pattern for fresh fuel bundle loading. The odd and even selections assume a two cycle loop. If the loop comprises three or more cycles, the selection of loading may be one of 1, 2, 3, etc. (rather than odd and even). The selection of the loading pattern, e.g., odd or even, may be done manually in step 76. The user setting up the shuffling algorithm may need only select odd or even, but may also review and modify other input parameters for the shuffling algorithm. The selection of the odd or even loading scheme may be automatically performed based on data indicating whether the prior loading cycle was odd or even and selecting an opposite loading pattern for the next cycle.

The inputs in FIG. 9 may also include input files that define a prior iteration of the fuel bundles in the core. These input files may be generated by a conventional core simulation program that reliably predicts the condition of the core and its fuel bundles during a fuel cycle. The simulation program generates data on the condition of the fuel bundles in the core during a fuel cycle. This data is used by the shuffling algorithm 70 to generate fuel loading maps for the next refueling cycle.

The input files may include the lead fresh bundle characters, BOC rods, BOC qualifier, EOC rods and EOC qualifier, provide constrains to be used by the shuffling algorithm in generating shuffling maps. For example, the lead fresh bundle characters is a common identifier, e.g., "C05", used for all bundles added in a particular fuel bundle reload operation; the BOC rods file, e.g., "rods.ced", refers to data, e.g., exposure values, regarding the fuel bundles at the beginning of the fuel cycle (BOC) in the preceding fuel cycle, and the EOC rod file is data on fuel bundles, e.g., bundle exposure values, at the end of a cycle (EOC); and the BOC and EOC qualifier files are data files that identify the identifiers, e.g., bundle handle numbers, for each of the fuel bundles in the core. The core simulator may generate the data files for the BOC and EOC rods.

In step 78, fuel bundle strategy maps of the core are loaded as inputs to the shuffling algorithm. These maps are templates used by the shuffling algorithm to determine which fuel locations are to have bundles that are not to be moved in the next cycle, locations to receive fresh bundles, locations from which bundles are to be discharged, and locations from which bundles are to be shifted.

FIGS. 10 and 11 are exemplary strategy maps. The strategy maps may include a fuel location map 80 that identifies all fuel bundle locations in the core (where "1"s indicate the locations of fuel bundles, and "0"s indicate locations with no fuel bundles and outside the core); a fuel type map 82 that identifies the fuel bundle type to be at each location of the core (where numbers 1 to 7 represent which of the seven possible types of fuels are to be located in each core fuel bundle site); a fuel discharge location map 84 that identifies the core locations having fuel bundles to be removed because the bundles have gone through three cycles (where "1"s indicate the locations having fuel bundles completing a third fuel cycle); a fresh bundle location map 86 for an odd cycle (where "1"s indicate the locations where fresh bundles are to be installed, and "0"s indicate fuel bundles to remain in their current location for a second fuel cycle); a fresh fuel bundle location map 88 during an even cycle (where "1"s indicate the locations fresh bundles are to be installed, and "0"s indicate fuel bundles to remain in their current location for a second fuel cycle); a twice burnt fuel map 90 (also referred to as the odd cycle fuel bundle shift map) for the odd cycles which indicates the core locations of fuel bundles having gone through two fuel cycles and that are to be shuffled to the perimeter (see map 84) for a third cycle (where "1"s indicate the locations of the twice burnt fuel bundles), and a twice burnt fuel map 92 (also referred to as the even cycle fuel bundle shift map) for the even cycles which indicates the core locations of fuel bundles having gone through two fuel cycles and that are to be shuffled to the perimeter (see map 86) for a third cycle (where "1"s indicate the locations of the twice burnt fuel bundles). These maps 80 to 92 identify the fuel bundle locations in the core where: fresh bundles are to be installed, bundles to be reused for a second cycle are to remain in their current locations, and from which bundles are to be shuffled for reuse for a third cycle. Although to the subject of a separate fuel bundle template, the fuel bundles to be discharged, e.g., moved to a pool, after two fuel cycles are a subject of the fresh fuel bundle location maps which are not also included in the twice burnt fuel maps.

The fuel bundle loading strategy maps 80 to 92 maps may be modified by the user or by using optimization tools, in step 94. The optimization tool may be a computer software program that perturbs one or more of the maps 80 to 92. The perturbed maps are input to the shuffling algorithm to determine if an enhanced loading strategy can be derived. An example of an optimization tool is disclosed in commonly assigned and co-pending U.S. patent application Ser. No. 11/610,197, the entirety of which is incorporated by reference. For example, the optimization tool may perturb the map 82 of fuel types at each bundle location. The perturbed map 82 is input to the shuffling algorithm to study and improve the fresh bundle selection and adhere to thermal margin requirements, reactivity margin requirements, and fuel cycle efficiency improvements.

In step 96, the shuffling algorithm reads information regarding the prior fuel loading cycle. The prior fuel loading cycle may be the output of a core simulator which modeled the operation of the core and its bundles based for the cycle prior to that which is being run through the shuffling program. The data regarding the prior cycles is provided by the files specified in the input files shown in FIG. 7 and including the BOC and EOC Cedar Rod Data Files and BOC and ECO Qualifiers.

An EOC exposure map for the prior cycle is useful in determining the amount of exposure for each fuel bundle at the EOC. By comparing the EOC and BOC exposure maps (e.g., comparing the EOC and BOC Cedar rod data files), the amount of exposure each core bundle location is predicted to experience in the next fuel cycle can be used to estimate the amount of exposure expected at the same location during the next cycle. The exposure prediction may be that each core bundle location will experience the same amount of exposure in the next cycle.

Figure 12:
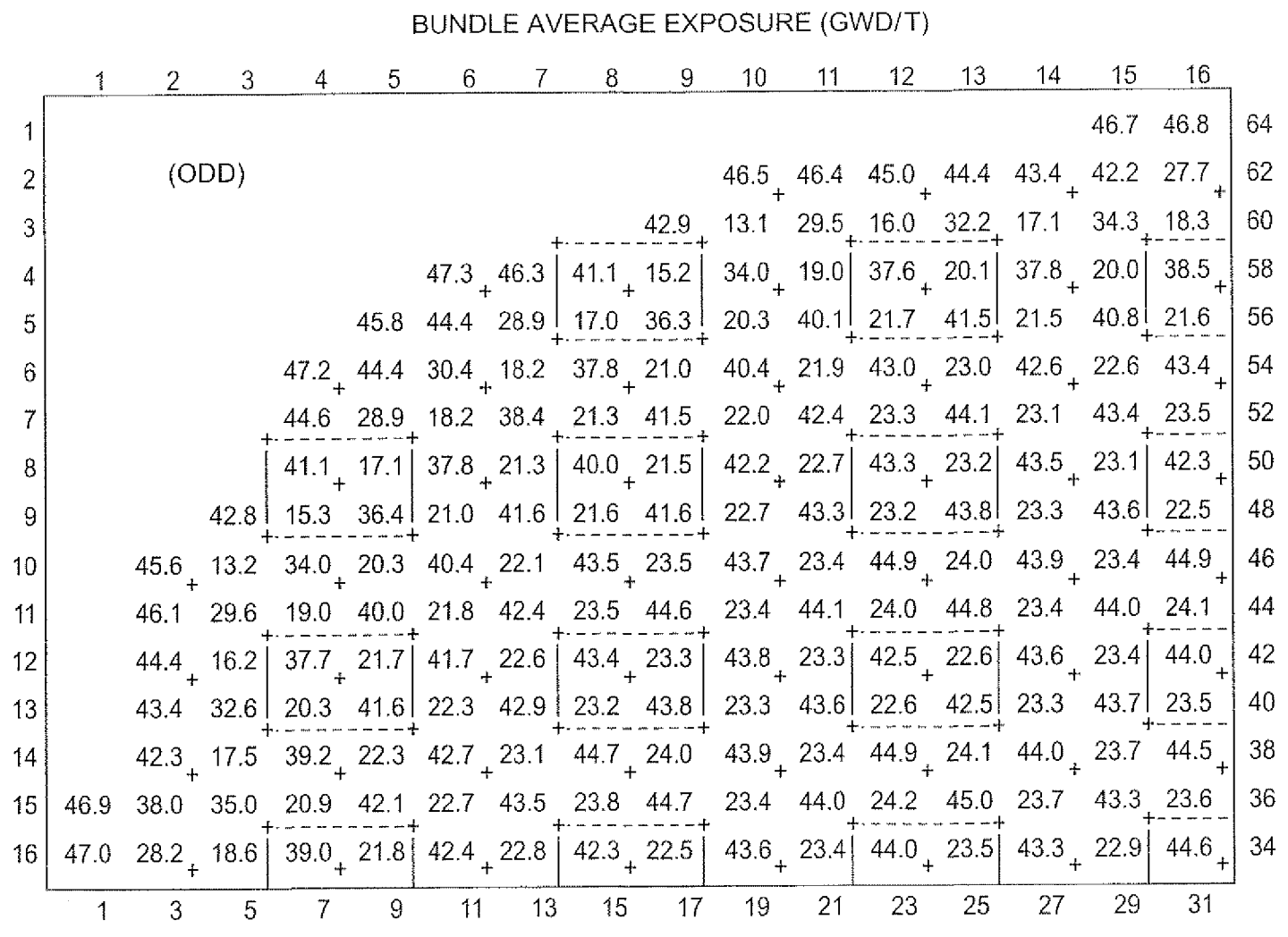

FIGS. 12 and 13 are examples of EOC exposure maps (e.g., Cedar rod data files). Examples of BOC exposure maps (e.g., Cedar rod data files) are shown in FIGS. 2 and 3. The exposure of each bundle during a single fuel cycle may be obtained by comparing the exposure of the fuel bundles at the BOC (see FIGS. 2 and 3) to the end of cycle (EOC) exposure for the same fuel bundles, as shown in FIGS. 12 and 13. FIGS. 12 and 13 shows the average exposure (GWD/T) for each fuel bundle in the core at the EOC. FIG. 12 shows an "odd" fuel map and corresponds to FIG. 2 in that FIG. 12 shows the fuel bundle exposures at the EOC for the same fuel bundles shown in FIG. 2, where FIG. 2 shows the exposure for bundles at the BOC.

An outer annular region 89 of the fresh bundle locations (map 88) in an even fuel loading cycle are same as the twice burnt locations from that even cycle (map 92). During an even fuel cycle, the twice burnt fuel bundles (map 92), e.g., bundles having already experienced two fuel cycles, are removed from the locations shown in map 92 and shifted to the perimeter of the core, e.g., to discharge locations specified in map 84. Fresh bundles are placed in the vacated locations of the bundles being shifted, where the vacated locations are identified by map 92. Fresh bundles placed at the outer annulus of the even fresh bundle map 88 are left in that position through two fuel cycles and then moved to the discharge location (map 84) for a third cycle. Similarly, the odd fuel loading cycle (map 87) has an outer annulus that overlaps the twice burnt fuel map 90 for the odd cycle. Accordingly, the bundles to be shuffled may be limited to the bundles to be shifted to the discharge locations (map 84) on the perimeter of the core, which are those bundles to undergo a third cycle.

In step 98 of the shuffle method 70, an error check is conducted of the inputs. For example, the map inputs in FIG. 8 may be analyzed to confirm that they account for all bundles. The total number of bundle locations in the discharge map (obtained by summing the "1"s in map 84) should equal the number of twice burnt fuel bundles to be shuffled for each of the odd and even maps 90 and 92. Another error check is to confirm that the total number of bundle core locations (each location designated by the number 1 in map 80) equals the combined sum of: (i) bundle discharge locations (each location designed by the number 1 in map 84), (ii) fresh bundle locations in the even cycle fresh bundle map 88 (each location designed by the number 1 in map 88), and (iii) fresh bundle locations in the odd cycle fresh bundle map 86 (each location designed by the number 1 in map 86).

In step 100, the shuffling algorithm determines the location dependent exposure value for each bundle location. This value is the exposure each bundle experiences during a cycle. The exposure value may be obtained by subtracting the EOC exposure from the BOC exposure for each bundle, e.g., subtracting the exposure values in FIG. 12 from FIG. 2 for each bundle. Similarly, FIG. 3 is a BOC exposure chart for an even fuel map and corresponds to the EOC map shown in FIG. 13. The exposure experienced by the core with the fuel bundle pattern shown in FIGS. 3 and 13 is the difference between the exposure values of FIGS. 13 and 3 for each fuel bundle. The exposure experienced by each bundle in the cycle is used by the shuffling algorithm to determine which fuel bundle may be shuffled to another core location.

In step 102, the shuffling algorithm ranks the exposure levels of each of the bundles to be shuffled. These bundles are at locations identified by the twice burnt fuel maps 90, 92. If the cycle currently being evaluated by the algorithm is an "even" cycle, the prior cycle was an odd cycle and the odd twice burnt fuel map 90 identifies bundle locations from the last cycle having bundles to be shuffled. The EOC exposure map from the prior cycle, e.g., FIG. 13 (odd EOC), provides the input data, e.g., EOC Cedar file, for determining the exposure levels for each of the bundles to be shuffled. The shuffling algorithm ranks, e.g., lowest to highest, the EOC exposure values for each of the bundles to be shuffled. In addition, the ranking may take into account the type of bundle in each location to be shuffled. For example, the bundles may be ranked in two dimensions, were one dimension is the fuel type of the bundle and the other dimension is the exposure level of the bundle. The ranking assists the shuffling algorithm in matching the bundles to be shuffled to new core locations at the perimeter as identified in the core discharge map 84.

In step 104, the shuffling algorithm generates shuffling instructions, e.g., a shuffling map identifying a new core location for each bundle to be shuffled. In determining a new core location for each bundle to be shuffled, the algorithm uses the EOC exposure level ranking (which identifies the exposures of the shuffled bundles from the preceding cycle and possibly the fuel type) to identify suitable bundles to be moved to a new core locations, e.g., to core locations near the perimeter as defined by the discharge map 84. The expected exposure at each of the locations identified on the discharge map 84, can be obtained from the difference between the EOC and BOC exposure levels for the bundles at those discharge locations in the preceding cycle. Knowing the exposure levels expected during the next cycle at each of the discharge locations and the ranking of exposure levels of bundles to be shuffled (map 90 and 92), the shuffling algorithm can identify the bundles with the lowest exposure for shuffling to the discharge locations with the highest predicted exposure during the next cycle. In this manner, the shuffling algorithm generates a shuffling map where each bundle to be shuffled. The shuffling map may identify which discharge core locations (see map 84) to place each of the twice used bundles (see map 90 for an odd refueling cycle and map 92 for an even cycle).

In step 106, the shuffling instructions are used to generate a core map identifying the fuel bundle at each bundle location in the core. The data for constructing a core map is available from computer data bases. The data includes the shuffling instructions (which identify bundles in the discharge locations—see map 84); the fresh bundle location map (either map 90 if the cycle is odd or map 92 if the cycle is even), and the EOC exposure map from the prior cycle, such as shown in FIGS. 12 and 13. The EOC exposure map provides exposure information for the fuel bundles that are to remain in the same core location for the next fuel cycle and for the fuel bundles that are shuffled. All other fuel bundles used in the next cycle are fresh.

Depending on whether the next fuel cycle is an even or odd fueling cycle, the generated exposure map is either an even cycle or odd cycle BOC exposure map, such as are shown in FIG. 2 or 3. Using the exposure map for the next cycle, a computer simulates the next fuel cycle of the core. Reactor simulators are conventional and outside the scope of this invention. U.S. Pat. No. 6,748,348, entitled "Design Method for Nuclear Reactor Fuel Management" and naming William E. Russell, II, as the inventor describes an exemplary reactor simulator. The reactor simulator generates data predicting the EOC of the simulated fuel cycle. The shuffling algorithm may be used independently with hand calculations and with close incorporation of three-dimensional (3D) optimization tools to provide for adherence of all thermal and reactivity performance criteria for the reactor core. Different core design strategies including "Control Cell Core" and "Conventional Design" simulators may utilize the shuffling mapping methodology disclosed herein.

The generated data includes EOC Cedar File (see FIG. 9) including in the user inputs 74 to the shuffling algorithm. The simulator may also output data regarding the BOC of the simulated cycle, including the BOC Cedar File. In step 108, the BOC and EOC fuel bundle data generated by the simulator are saved as data and made available for step 96 of the next iteration of the shuffling algorithm as it generates shuffling instructions for the next fuel loading cycle.

After the simulator generates data of the predicted next cycle, e.g., BOC and EOC exposure maps, the shuffling algorithm switches the odd/even setting in the user input file 74 (FIG. 9). The shuffling algorithm is restarted for another fuel loading cycle, which is the cycle immediately after the last cycle for which the shuffling algorithm and simulator have simulated. Before restarting, the algorithm changes from odd to even or even to odd in step 110. The shuffling and simulator run through successive fuel cycles.

A loop of fuel cycles with odd and even fuel patterns is shown by the sequence of FIG. 2 to FIG. 12 to FIG. 3 to FIG. 13 and back to FIG. 2. FIG. 2 represents an odd pattern of fresh fuel core locations in the central region 26. The exposure levels shown in FIG. 2 are at the BOC. FIG. 12 represents the exposure levels of the fuel bundles at the EOC of the same odd pattern shown in FIG. 2. For example, in FIG. 12, the fuel bundles in the center core region 26 are either bundles (see bundle at core location col. 14, row 10 having an exposure of 43.9) having been through two cycles and near their exposure limit of 44.0 or bundles having served just one cycle and ready to serve a second cycle in the same location (see bundle at col. 14, 11 having an exposure of 23.4).

During an odd fuel cycle, the exposure levels of the fuel bundles at the BOC are as shown in FIG. 2 and as are shown in FIG. 12 at the EOC. Similarly, FIG. 3 represents an even pattern of fresh fuel core locations in the central region 26. The exposure levels shown in FIG. 3 are at the BOC. FIG. 13 represents the exposure levels of the fuel bundles at the EOC of the same even pattern shown in FIG. 3. During an even fuel cycle, the exposure levels of the fuel bundles at the BOC are as shown in FIG. 3 and as are shown in FIG. 13 at the EOC. The loop of fuel cycles through the even and odd patterns of fuel loading is shown by the sequence of FIGS. 2 and 12 which constitutes one cycle, and the sequence of FIGS. 3 and 13 that constitute the second cycle. The loop is the two cycles together. The loop repeats through the life of the BWR.

FIGS. 12 and 13 show EOC bundle maps that reflect the results of the shuffling algorithm. Nearly all of the fuel bundles to be discharged have exposures of between 42 to 47.3, which is a small range. At the perimeter of the core where bundles undergo three cycles, the exposures are in a range of 5 GWD/T. Because the discharge bundles, especially at the perimeter, are all very close in exposure, the concern is minimized that one of the fuel bundles will experience an exposure excessive as compared to the other bundles. Accordingly, the overall discharge exposure limit can be can be increased.

The shuffling algorithm continues to loop through even and odd fuel cycles until an equilibrium solution is reached. The algorithm 70 stores the generated shuffling instructions for the interactions of cycles. These successive core loading maps together become part of the core loading strategy for the life of the reactor. The shuffling methodology disclosed herein may also be used to provide radial enrichment utilization that provides higher enrichment rings towards the perimeter of the core, reduced enrichment at control cell locations, and reduced enrichment on axis lines have also been developed in unison with this new methodology.

BWR core designs that have utilized the shuffling algorithm disclosed herein have been found to be very similar core operating characteristics, e.g., exposure levels, for successive cycles, even though the fresh locations between the two cycles are dissimilar. The core maps provided by the shuffling algorithm disclosed herein have been used to minimize discharge exposure and provide adequate thermal margins, reactivity margins and excellent fuel cycle efficiency. The core loading plans developed with the algorithm disclosed herein have yielded loading strategies with 86% fewer shuffles than traditional core loading strategies. The reduction in the shuffling of fuel bundles provides reduced reactor outage, e.g., reducing the outage by several days. The reduction in outage days translates directly to additional days of power generation and revenue from power generation. It is estimated that a BWR can generation one million US dollars of energy per day. By this measure, each one day reduction in outage time provides a gain of a million dollars for each loading cycle.

While reducing shuffle time is important, it is important that the design produce the required thermal margins, reactivity margins, and desired energy. The simulator step 106 may include a check to confirm that the core plan, e.g., BOC core map of fuel bundles, satisfies all design constraints, such as safety margins. To a lesser extent, but also important for equilibrium studies, the designs should also show similar comparisons between sequential cycles. For example, it is advantageous for purposes of equilibrium for two successive odd fuel cycles to have similar exposures and performance and similarly that two successive even fuel cycles have similar exposures and performance. Indeed, equilibrium may be determined to have been reached when successive interactions of even cycle the shuffling algorithm and core simulations yield similar results and/or successive iterations of odd cycles of the shuffling algorithm and core simulation yield similar results. Because the shuffling methodology analyzes bundle exposure, e.g., bundle depletion, in the prior cycle and determines the location dependent potential for exposure accumulation, a bundle that best utilizes this location is provided by the shuffling methodology. Loading strategies that meet the design criteria are produced by the shuffling algorithm.

Figure 14:
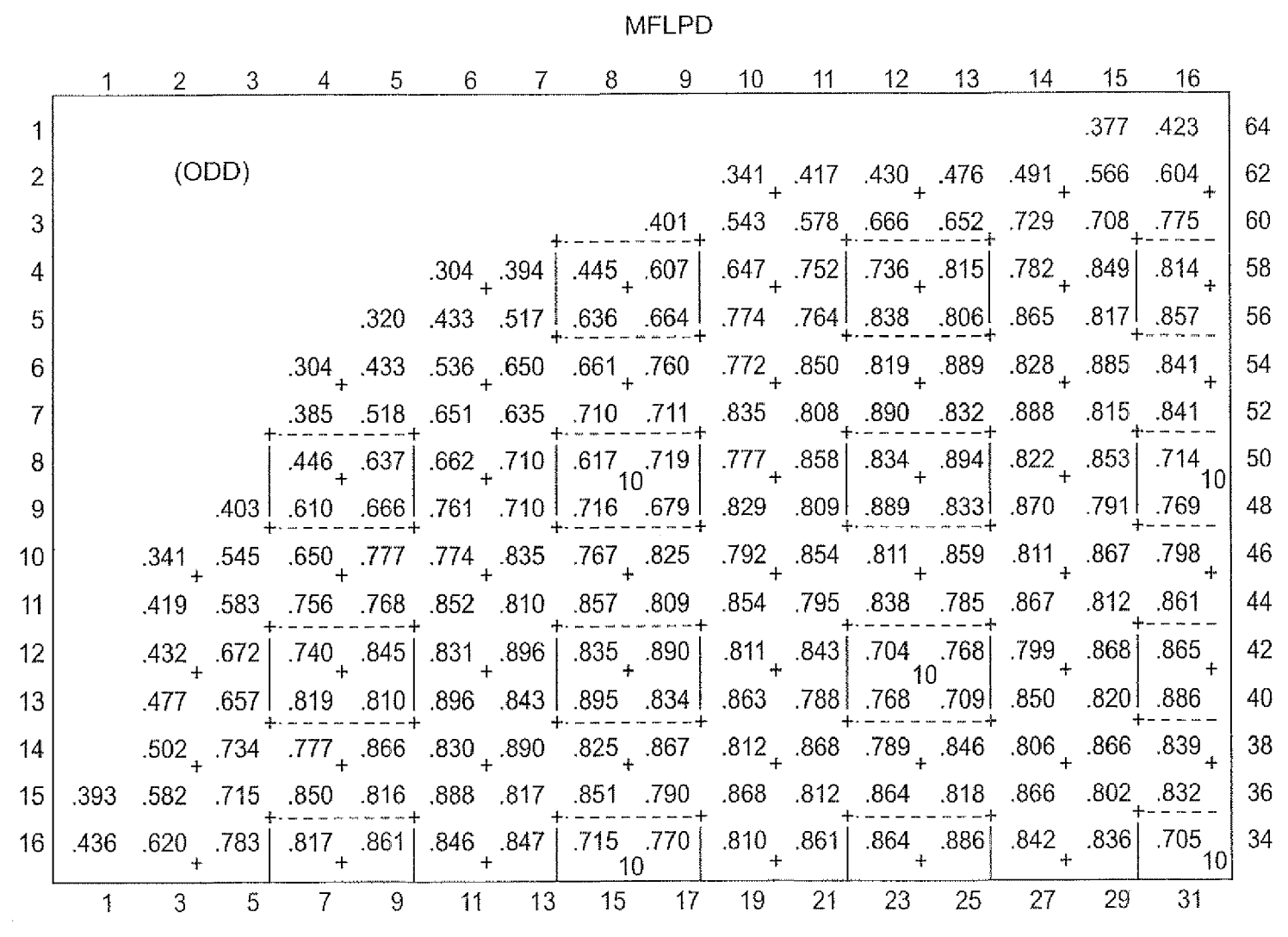
Figure 15:
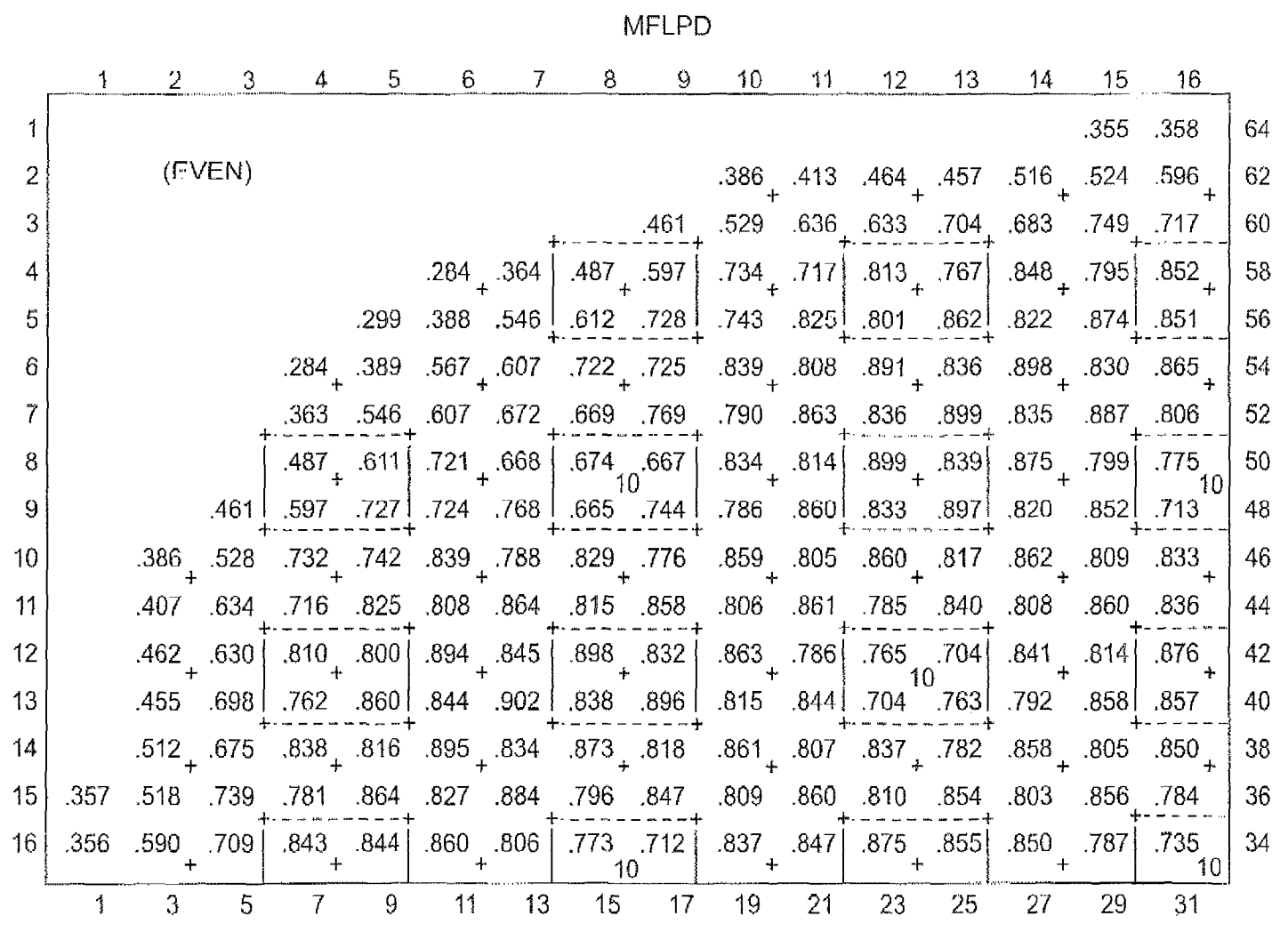

FIGS. 14 and 15 shown odd and even BOC maps of core bundles where the values, e.g., 0.886 (at core location 13-16), correspond to the margin between the BOC exposure limit and the actual BOC exposure for the bundle. The core location of the fuel bundles shown in FIGS. 14 and 15 were determined by the shuffling algorithm. The shuffling algorithm is useful in producing cores having bundles that all operate near design targets. A margin value of 0.886 indicates that the bundle has an exposure of 88.6% of the exposure limit which corresponds to a margin of 11.4%. A design target is to have a 10% margin. The exposure limit is set for each bundle location and depends on whether the bundle at the location is to serve one or two additional cycles and the amount of exposure expected at that location for the next cycle. The margins for all of the bundles shown in the core maps at FIGS. 14 and 15 are fairly close and generally between a 25% to 11% margin, except at the perimeter of the core. Establishing a core map such that the bundles in the core are relatively near a design target is advantageous and indicates good utilization of the fuel bundles.

FIGS. 16 and 17 show EOC critical power ratio (CPR) limits for each bundle in an odd (FIG. 16) and even (FIG. 17) fueling cycle. These figures show that the bundles are near the design CPR targets of 0.85 (a 15% the target).

FIGS. 18 and 19 are exemplary beginning of cycle (BOC) and middle of cycle (MOC), respectively, charts of an entire core of the shut down margins (SDM) of each cell in the core. These charts show the SDM for a fuel loading map generated using the shuffling algorithm disclosed herein. The SDMs are relatively uniform in that most SDMs are in a range of 2.2 to 1.4 at the BOC and 2.7 to 1.3 at the MOC, except on the perimeter and center of the core. A relatively narrow range of SDMs, as shown in FIGS. 18 and 19 indicate effective fuel loading.

Novel aspect of the method and system discloused herein may include: an automated solution for generating shuffling instructions for each fuel loading cycle; a shuffling algorithm that can be used in conjuction with a core simulator to develop an equilibrium core strategy; user defined inputs and data from previous fuel loading cycles are used to dertermine shuffle locations; exposure accumulation potencial; the shuffling algorithm may be used with manual and/or software optimization tools to develop enhanced shuffling instrucctions; the shuffling may be used with a variety of fresh fuel utilization plans; the shuffling algorithm is useful to place bundles with higher enrichments towards the perimeter where the bundles experience longer exposures, and the shuffle algorithm accomodates llow enrichment bundles at locationes for control cell opereation suuport low enrichment on axis for face adjacent considerations, and the shiuffle algorithm provides for automatic selection of twice burnt fuel bundles to be shuffled where the shuffling is determined based or exposure and distance of travel.

Technical effects of the method and system disclosed herein include: core loading designs with great fundamentals; Better BOC kw/ft utilization; better EOC CPR utilization, and better EOC discharge exposure; nice target equilibrium no-shuffle solutions. Commercial advantages of the method and system disclosed herein may include: customer outages that are 3 days or less; increase in revenue from more power production periods resulting from the shortage outage periods; lower manpower costs due to the shorter outage periods; fewer shuffles results in reduced risk of fuel loading errors and rapid no-shuffle core design solutions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for generating fuel loading data for a core in a nuclear reactor, wherein the core includes an array of fuel locations, the method comprising:

defining an even cycle fuel bundle shift map of fuel bundles to be shifted to another core location during an even fuel loading cycle;

defining an odd cycle fuel bundle shift map of fuel bundles to be shifted to another core location during an odd loading cycle, wherein the odd fuel loading cycle and even fuel loading cycle are alternative core refueling cycles;

defining a discharge map identifying the another locations to receive the bundles from the locations identified in the even and odd cycle fuel bundle shift maps, and generating shuffling instructions indicating which fuel bundles from a prior refueling cycle are to be shifted to one of the another locations of the core for a subsequent fuel cycle, wherein fuel bundles to be shifted during the even fuel loading cycle are selected from the fuel bundles identified to be shifted in the even cycle fuel bundle shift map and bundles to be shifted during the odd fuel bundle loading cycle are selected from the fuel bundles identified to be shifted in the odd cycle fuel bundle shift map.

2. A method as in claim 1 wherein the even cycle shift fuel bundle shift map and odd cycle fuel bundle shift map identify locations of fuel bundles having previously undergone two fuel cycles, and the discharge map identifies core locations to receive fuel bundles to undergo a third fuel cycle.

3. A method as in claim 1 further comprising:
defining an even cycle fresh fuel bundle loading map for the core, where the map identifies core locations to receive fresh fuel bundles in each even cycle fuel loading cycle;

defining an odd cycle fresh fuel bundle loading map for the core, where the map identifies core locations to receive fresh fuel bundles in each odd fuel loading cycle, and generating fresh fuel loading instructions based on the even cycle fresh fuel bundle loading map for the even fuel loading cycle and generating fresh fuel loading instructions based on the odd cycle fresh fuel bundle loading map for the odd fuel loading cycle.

4. A method as in claim 3 wherein fuel bundle locations of fuel bundles identified to be shifted in the even cycle fuel bundle shift map are a subset of fuel bundle locations identified to receive fresh fuel bundles in the even cycle fresh fuel map.

5. A method as in claim 4 wherein the fuel bundle locations in the subset are arranged radially outward in the core with respect to fresh fuel locations identified in the even cycle fresh fuel bundle loading map not within the subset.

6. A method as in claim 3 further comprising determining whether a sum of all core locations identified to receive fresh fuel bundles in the even and odd cycle fresh fuel bundle maps and all core locations identified for discharge in the discharge map equals a total of all fuel bundle locations in the core.

7. A method as in claim 1 wherein the fuel bundle locations identified to be shifted in the even cycle fuel bundle shift map are at core locations corresponding to the fuel bundles identified to not be shifted in the odd cycle fuel bundle shift map.

8. A method as in claim 1 wherein only fuel bundles identified in the even and odd cycle fuel bundle shift maps are to be shifted to the other core locations during successive even and odd fuel loading cycles.

9. A method as in claim 1 further comprising performing successive iterations of the method to generate shuffling instructions for successive even and odd fuel loading cycles.

10. A method for developing an equilibrium core loading strategy for a nuclear reactor, where the core includes an array of fuel bundle locations, the method comprising:
generating a fuel loading map for an even fuel loading cycle based on an even cycle fresh fuel bundle loading template, an even cycle fuel bundle shift template identifying fuel locations from which bundles are to be shifted, and a discharge map identifying fuel locations from which twice used fuel bundles are to be removed during the even fuel loading cycle;

generating a fuel loading map for an odd fuel loading cycle based on an odd cycle fresh fuel bundle loading template, an odd cycle fuel bundle shift template, and the discharge map identifying fuel location, wherein the odd fuel loading cycle alternates with the even fuel loading cycle;

generating an even cycle fuel bundle exposure map based on the generated even cycle fuel loading map and data regarding exposure levels for each fuel bundle identified in the even cycle fuel bundle loading map;

generating an odd cycle fuel bundle exposure map based on the generated odd cycle fuel loading map and data regarding exposure levels for each fuel bundle identified in the odd cycle fuel bundle loading map;

repeating the steps of generating fuel loading maps and fuel bundle exposure maps for at least two successive loops of even and odd fuel loading cycles;

comparing the even cycle fuel bundle exposure maps for two successive even cycles, and determining if the compared exposure maps converge to within a predetermined level of similarity;

if the successive even cycle fuel bundle exposure maps do not converge, repeating the steps of generating fuel loading maps and fuel bundle exposure maps for at least two successive loops of even and odd fuel loading cycles and comparing successive even cycle fuel bundle exposure maps, and if the compared successive even cycle fuel bundle exposure maps converge, reporting an equilibrium fuel loading strategy for the core.

11. The method of claim 10 further comprising optimizing the equilibrium solution by perturbing at least one of the fuel loading maps and repeating the steps of the method with the perturbed map.

12. The method of claim 10 wherein the even and odd cycle fresh fuel bundle maps do not both identify the same fuel bundle locations to receive a fresh fuel bundle.

13. A method as in claim 10 wherein core locations of bundles identified to be shifted in the even cycle fuel bundle shift map is a subset of core locations identified to receive fresh fuel bundles in the even cycle fresh fuel map.

14. A method as in claim 10 further comprising determining whether a sum of all core locations identified to receive fresh fuel bundles in the even and odd cycle fresh fuel bundle maps and all core locations identified for discharge in the discharge map equals a total of all fuel bundle locations in the core.

15. A group of core maps for a nuclear reactor, each core map identifying locations in the core for nuclear fuel bundles the maps comprising:
an even cycle fresh fuel bundle map identifying core locations to receive a fresh fuel bundle;

an odd cycle fresh fuel bundle map identifying core locations to receive a fresh fuel bundle, wherein the odd cycle and even cycle are alternative core refueling cycles;

an even cycle fuel bundle shift map identifying fuel bundles to be shifted to another core location;

an odd cycle fuel bundle shift map identifying fuel bundles to be shifted to another core location;

a discharge map identifying the another core locations to receive the bundles from the core locations identified in the even and odd cycle fuel bundle shift maps.

16. A group of core maps as in claim 15 wherein the even cycle fuel bundle shift map and the odd cycle fuel bundle shift maps identify core locations of fuel bundles having previously undergone two fuel cycles, and the discharge map identifies core locations to receive fuel bundles to undergo a third fuel cycle.

17. A group of core maps as in claim 15 wherein core locations of bundles to be shifted identified in the even cycle fuel bundle shift map are a subset of core locations identified to receive fresh fuel bundles in the even cycle fresh bundle fuel map.

18. A group of core maps as in claim 15 wherein a check is performed to confirm that a sum of all core locations identified to receive fresh fuel bundles in the even and odd cycle fresh fuel bundle maps and all core locations identified for discharge in the discharge map equals a total of all fuel bundle locations in the core.

19. A group of core maps as in claim 15 wherein the fuel bundle locations identified to be shifted in the even cycle fuel bundle shift map are at the same core locations of the fuel bundles identified to not be shifted in the odd cycle fuel bundle shift map.

20. A group of core maps as in claim 15 wherein only fuel bundles identified in the even and odd cycle shift maps are to be shifted to another core location during successive even and odd fuel loading cycles.

\* \* \* \* \*

UNITED STATES PATENT AND TRADEMARK OFFICE
CERTIFICATE OF CORRECTION

PATENT NO. : 7,480,599 B2
APPLICATION NO. : 11/617396
DATED : January 20, 2009
INVENTOR(S) : William Russell, II et al.

It is certified that error appears in the above-identified patent and that said Letters Patent is hereby corrected as shown below:

Column 16, line 24, delete "aspect" and insert --aspects--

Column 16, line 24, delete "discloused" and insert --disclosed--

Column 16, line 27, delete "conjuction" and insert --conjunction--

Column 16, line 29, delete "dertermine" and insert --determine--

Column 16, line 30, delete "potencial" and insert --potential--

Column 16, lines 32-33, delete "instruct-ctions" and insert --instructions--

Column 16, line 33, delete "shuffling may" and insert --shuffling algorithm may--

Column 16, line 37, delete "accommodates llow" and insert --accommodates low--

Column 16, lines 37-38, delete "loca-tiones" and insert --locations--

Column 16, line 38, delete "opereation suuport" and insert --operation supports--

Column 16, line 39, delete "shiuffle" and insert --shuffle--

Column 16, line 42, delete "or" and insert --on--

UNITED STATES PATENT AND TRADEMARK OFFICE
CERTIFICATE OF CORRECTION

PATENT NO. : 7,480,599 B2
APPLICATION NO. : 11/617396
DATED : January 20, 2009
INVENTOR(S) : William Russell, II et al.

It is certified that error appears in the above-identified patent and that said Letters Patent is hereby corrected as shown below:

In the Claims:

Claim 10, Column 18, line 32, delete "fuel" and insert --fuel--

Claim 15, Column 18, line 53, delete "bundles" and insert --bundles,--

Signed and Sealed this

Seventeenth Day of March, 2009

JOHN DOLL
*Acting Director of the United States Patent and Trademark Office*